(12) United States Patent
Umeda et al.

(10) Patent No.: US 7,078,918 B2
(45) Date of Patent: Jul. 18, 2006

(54) CAPACITANCE DETECTING CIRCUIT AND METHOD, AND FINGERPRINT SENSOR USING THE SAME

(75) Inventors: Yuichi Umeda, Miyagi-ken (JP); Junichi Saito, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 91 days.

(21) Appl. No.: 10/986,505

(22) Filed: Nov. 10, 2004

(65) Prior Publication Data

US 2005/0141263 A1 Jun. 30, 2005

(30) Foreign Application Priority Data

Nov. 25, 2003 (JP) ............................. 2003-394001

(51) Int. Cl.
*G01R 27/26* (2006.01)
(52) U.S. Cl. ...................... 324/679; 324/686; 382/124
(58) Field of Classification Search ................ 324/679, 324/686; 382/124
See application file for complete search history.

(56) References Cited

U.S. PATENT DOCUMENTS 5,633,594 A 5/1997 Okada
6,538,456 B1 * 3/2003 Dickinson et al. .......... 324/658

* cited by examiner

*Primary Examiner*—Vincent Q. Nguyen
(74) *Attorney, Agent, or Firm*—Beyer, Weaver & Thomas, LLP.

(57) ABSTRACT

In a capacitance detecting circuit, changes in capacitances at intersections between a plurality of row lines and a column line are detected as voltages. The capacitance detecting circuit includes a column-line driver for driving the column line. A code generator generates code having orthogonality in chronological order. A selection synthesizer selects a certain number of row lines from the plurality of row lines by using the code and synthesizes measured voltages at the intersections between the selected row lines and the driven column line so as to output the synthesized measured voltage. A decoding computation unit separates the measured voltages corresponding to the capacitances at the intersections by performing product sum computation between the synthesized measured voltage and the code.

11 Claims, 16 Drawing Sheets

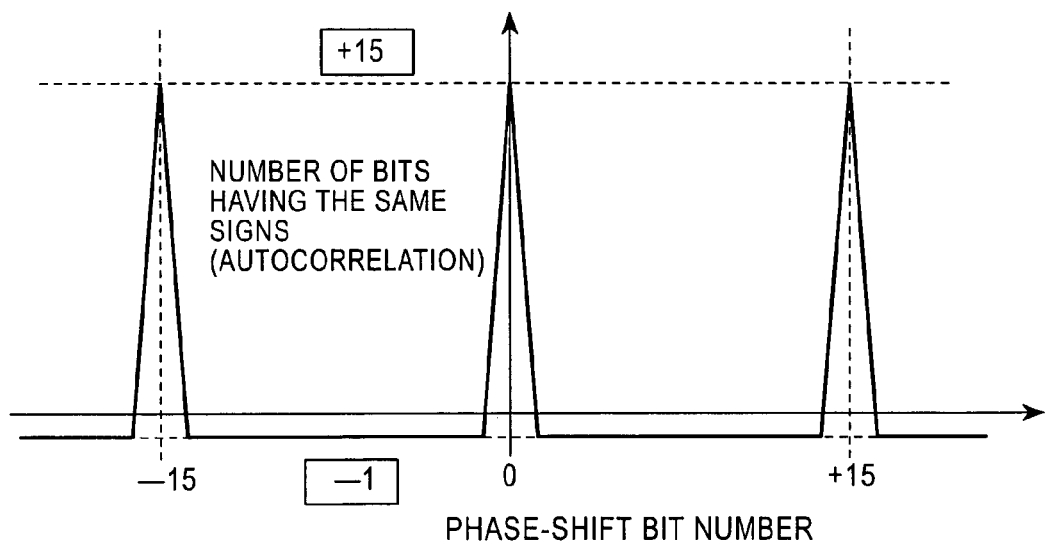

| | 1 | 2 | 3 | 4 | 5 | 6 | 7 | 8 | 9 | 10 | 11 | 12 | 13 | 14 | 15 | SHIFT AMOUNT |
|---|---|---|---|---|---|---|---|---|---|---|---|---|---|---|---|---|
| t1 | 1 | 0 | 0 | 0 | 1 | 0 | 0 | 1 | 1 | 0 | 1 | 0 | 1 | 1 | 1 | 0 |
| t2 | 1 | 1 | 0 | 0 | 0 | 1 | 0 | 0 | 1 | 1 | 0 | 1 | 0 | 1 | 1 | 1 |
| t3 | 1 | 1 | 1 | 0 | 0 | 0 | 1 | 0 | 0 | 1 | 1 | 0 | 1 | 0 | 1 | 2 |
| t4 | 1 | 1 | 1 | 1 | 0 | 0 | 0 | 1 | 0 | 0 | 1 | 1 | 0 | 1 | 0 | 3 |
| t5 | 0 | 1 | 1 | 1 | 1 | 0 | 0 | 0 | 1 | 0 | 0 | 1 | 1 | 0 | 1 | 4 |
| t6 | 1 | 0 | 1 | 1 | 1 | 1 | 0 | 0 | 0 | 1 | 0 | 0 | 1 | 1 | 0 | 5 |
| t7 | 0 | 1 | 0 | 1 | 1 | 1 | 1 | 0 | 0 | 0 | 1 | 0 | 0 | 1 | 1 | 6 |
| t8 | 1 | 0 | 1 | 0 | 1 | 1 | 1 | 1 | 0 | 0 | 0 | 1 | 0 | 0 | 1 | 7 |
| t9 | 1 | 1 | 0 | 1 | 0 | 1 | 1 | 1 | 1 | 0 | 0 | 0 | 1 | 0 | 0 | 8 |
| t10 | 0 | 1 | 1 | 0 | 1 | 0 | 1 | 1 | 1 | 1 | 0 | 0 | 0 | 1 | 0 | 9 |
| t11 | 0 | 0 | 1 | 1 | 0 | 1 | 0 | 1 | 1 | 1 | 1 | 0 | 0 | 0 | 1 | 10 |
| t12 | 1 | 0 | 0 | 1 | 1 | 0 | 1 | 0 | 1 | 1 | 1 | 1 | 0 | 0 | 0 | 11 |
| t13 | 0 | 1 | 0 | 0 | 1 | 1 | 0 | 1 | 0 | 1 | 1 | 1 | 1 | 0 | 0 | 12 |
| t14 | 0 | 0 | 1 | 0 | 0 | 1 | 1 | 0 | 1 | 0 | 1 | 1 | 1 | 1 | 0 | 13 |
| t15 | 0 | 0 | 0 | 1 | 0 | 0 | 1 | 1 | 0 | 1 | 0 | 1 | 1 | 1 | 1 | 14 |

FIG. 14
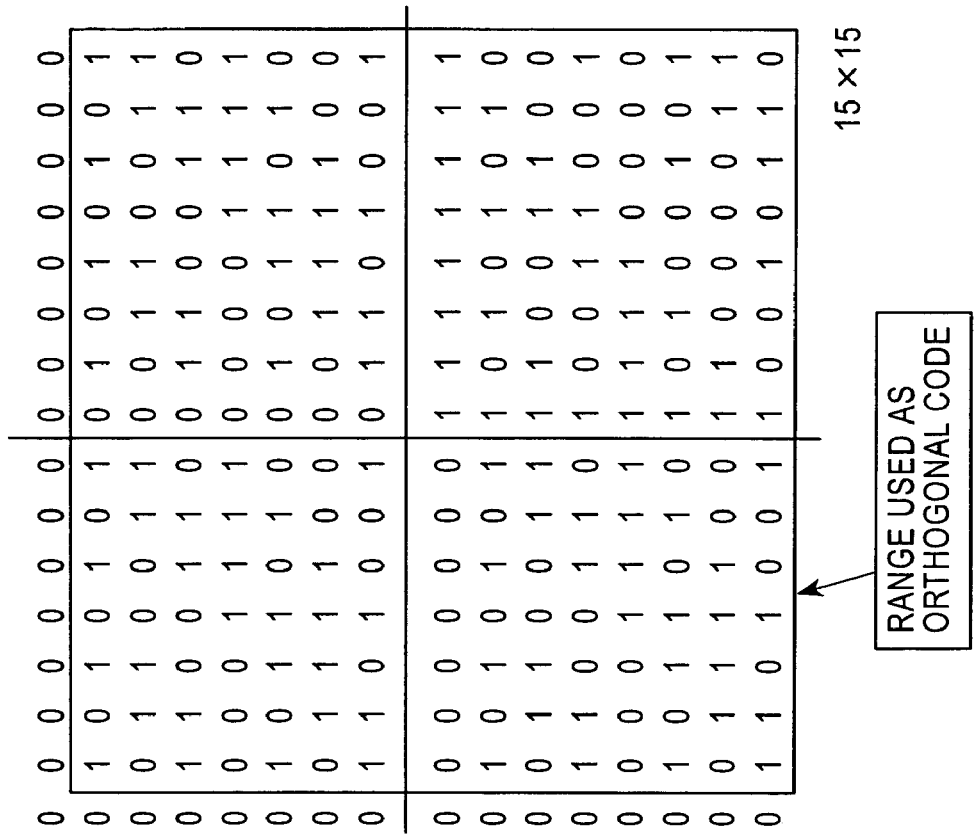
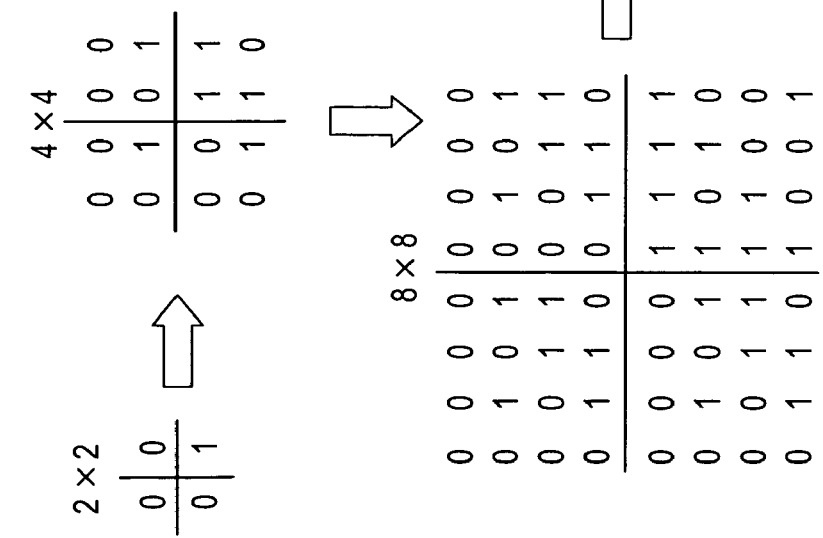

FIG. 15

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| t1 | 1 | 0 | 1 | 0 | 1 | 0 | 1 | 0 | 1 | 0 | 1 | 0 | 1 | 0 | 1 |
| t2 | 0 | 1 | 1 | 0 | 0 | 1 | 1 | 0 | 0 | 1 | 1 | 0 | 0 | 1 | 1 |
| t3 | 1 | 1 | 0 | 0 | 1 | 1 | 0 | 0 | 1 | 1 | 0 | 0 | 1 | 1 | 0 |
| t4 | 0 | 0 | 0 | 1 | 1 | 1 | 1 | 0 | 0 | 0 | 0 | 1 | 1 | 1 | 1 |
| t5 | 1 | 0 | 1 | 1 | 0 | 1 | 0 | 0 | 1 | 0 | 1 | 1 | 0 | 1 | 0 |
| t6 | 0 | 1 | 1 | 1 | 1 | 0 | 0 | 0 | 0 | 1 | 1 | 1 | 1 | 0 | 0 |
| t7 | 1 | 1 | 0 | 1 | 0 | 0 | 1 | 0 | 1 | 1 | 0 | 1 | 0 | 0 | 1 |
| t8 | 0 | 0 | 0 | 0 | 0 | 0 | 0 | 1 | 1 | 1 | 1 | 1 | 1 | 1 | 1 |
| t9 | 1 | 0 | 1 | 0 | 1 | 0 | 1 | 1 | 0 | 1 | 0 | 1 | 0 | 1 | 0 |
| t10 | 0 | 1 | 1 | 0 | 0 | 1 | 1 | 1 | 1 | 0 | 0 | 1 | 1 | 0 | 0 |
| t11 | 1 | 1 | 0 | 0 | 1 | 1 | 0 | 1 | 0 | 0 | 1 | 1 | 0 | 0 | 1 |
| t12 | 0 | 0 | 0 | 1 | 1 | 1 | 1 | 1 | 1 | 1 | 1 | 0 | 0 | 0 | 0 |
| t13 | 1 | 0 | 1 | 1 | 0 | 1 | 0 | 1 | 0 | 1 | 0 | 0 | 1 | 0 | 1 |
| t14 | 0 | 1 | 1 | 1 | 1 | 0 | 0 | 1 | 1 | 0 | 0 | 0 | 0 | 1 | 1 |
| t15 | 1 | 1 | 0 | 1 | 0 | 0 | 1 | 1 | 0 | 0 | 1 | 0 | 1 | 1 | 0 |

(LSB) ... (MSB)

ORTHOGONAL CODE (15×15)

FIG. 18

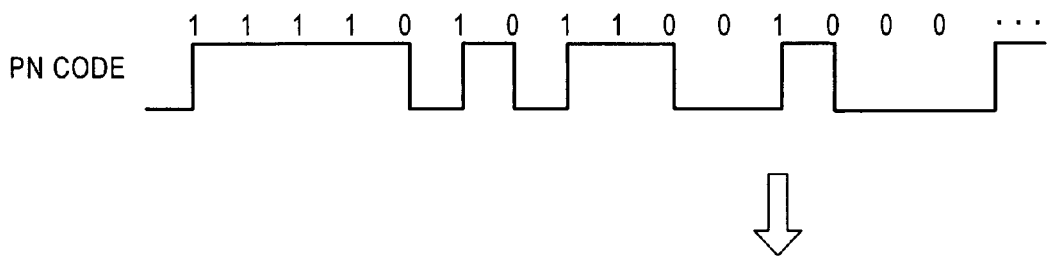

DECODE BY PRODUCT SUM COMPUTATION
BETWEEN TIME-SERIES DATA di AND PN CODE

| ds1 | = +d1+d2+d3+d4−d5+d6−d7+d8+d9−d10−d11+d12−d13−d14−d15 |
| ds2 | = −d1+d2+d3+d4+d5−d6+d7−d8+d9+d10−d11−d12+d13−d14−d15 |
| ds3 | = −d1−d2+d3+d4+d5+d6−d7+d8−d9+d10+d11−d12−d13+d14−d15 |
| ds4 | = −d1−d2−d3+d4+d5+d6+d7−d8+d9−d10+d11+d12−d13−d14+d15 |
| ⋮ | ⋮ |
| ds15 | = +d1+d2+d3−d4+d5−d6+d7+d8−d9−d10+d11−d12−d13−d14+d15 |

\* IMAGINARY DETECTION VALUE AT UNCONNECTED PORTION →
  CORRECT ds1 THROUGH ds14 AS DC COMPONENT CORRECTION DATA

CAPACITANCE DETECTING CIRCUIT AND METHOD, AND FINGERPRINT SENSOR USING THE SAME

BACKGROUND OF THE INVENTION

1. Field of the Invention

The present invention relates to a capacitance detecting circuit and method for detecting a very small capacitance, and also to a fingerprint sensor using the same.

2. Description of the Related Art

As a known fingerprint sensor, which is considered to be most promising in biometrics techniques, the following type of pressure-sensitive capacitance sensor has been developed. Row lines and column lines are formed at predetermined intervals on the surfaces of two films, and the two films are disposed with a predetermined gap therebetween such that they face each other with an insulating film therebetween.

In this pressure-sensitive capacitance sensor, when a finger is placed on the sensor, the shape of the films are changed according to the ridges and valleys of the fingerprint, and accordingly, the intervals between the row lines and the column lines are changed. Thus, the shape of the fingerprint is detected as capacitances at the intersections of the row lines and the column lines.

In this type of sensor, to detect a capacitance of less than several hundred fF (femtofarads), a detecting circuit for converting the capacitance into an electrical signal by using a switched capacitor circuit is conventionally used. More specifically, in this sensor, a sensor capacitor device for detecting the capacitance of a subject by being driven by a first sensor drive signal and a reference capacitor device for generating a reference capacitance for the detecting circuit by being driven by a second sensor drive signal are connected to a common switched capacitor circuit. Then, first and second sample-and-hold circuits, which are alternately operating, sample the output signals of the sensor capacitor device and the reference capacitor device, and then determine the difference between the sampled signals, thereby obtaining a detection signal.

In this detecting circuit, a signal which is proportional to the capacitance Cs of the subject and which is inversely proportional to the feedback capacitance Cf can be stably detected by the common switched capacitor circuit. Additionally, the leakage (feedthrough) of electric charge Qd stored in a parasitic capacitance formed between the gate electrode of a reset switch (feedback control switch) of the switched capacitor circuit and the other electrodes to the these electrodes can be offset. Also, offset components of the reference potential of the switched capacitor circuit or low-frequency noise contained in the input signal can be removed to a certain degree by determining the difference between the sampled signals (for example, see Japanese Unexamined Patent Application Publication No. 8-145717 (paragraphs 0018-0052, FIGS. 1 through 4)).

It is demanded that a capacitance detecting circuit used in, for example, a fingerprint sensor, have high sensitivity since capacitance changes are very small. At the same time, however, the detecting circuit must have resistance to noise (including high-frequency noise) transmitted from a human body or noise from other circuitry.

It is also demanded that the capacitance detecting circuit is not vulnerable to crosstalk noise between adjacent row lines or column lines.

To satisfy these demands, the following type of capacitance detecting circuit can also be considered. At the rise of a column line, a charging voltage corresponding to the electric charge charged in the capacitor at the intersection between the row line and the corresponding column line is detected. Then, at the fall of the column line, a discharging voltage corresponding to the electric charge discharged from the capacitor at the intersection between the row line and the column line is detected. A change in the capacitance is then detected by using the charging voltage and the discharging voltage.

That is, in this capacitor detecting circuit, the difference voltage is determined by subtracting the discharging voltage from the charging voltage so as to detect a change in the capacitance. Accordingly, the voltage offset occurring at the same polarities caused by the feedthrough of an amplifying circuit or offset components generated in other circuits can be eliminated, thereby removing noise having much lower frequencies than the sampling frequency.

In regular detecting circuits including the above-described capacitance detecting circuits, to detect a capacitance change of each sensor device of a capacitance sensor, only a single column line is driven to detect changes in the capacitances Cs at the intersections between the column line and a plurality of row lines. As described above, a capacitance change per sensor device (one intersection) is very small, i.e., about several hundred fF.

Accordingly, in the known capacitor detecting circuits, even if offset components in the circuitry including the amplifying circuit are eliminated, the detecting circuit is influenced by noise originally superposed on the capacitor sensor.

Thus, in the capacitor detecting circuits, conducted noise transmitted to the capacitor sensor via a power supply or a human body is superposed on signals in the row lines and the column lines, thereby making it difficult to precisely detect a capacitance change due to this external disturbance noise.

In inverted fluorescent light, which is mainly used as current fluorescent light, a fluorescent lamp is switched ON by generating high frequencies by using semiconductors, causing noise having a fundamental frequency at a several dozens of KHz level.

In the above-described capacitor detecting circuits, the cycle of the sampling frequency for detecting capacitor changes when determining the difference between the charging voltage and the discharging voltage is close to the cycle of the fundamental frequency of the above-described noise.

Accordingly, in the capacitor detecting circuits, beat components caused by a frequency difference, that is, beat components (beat frequency) equal to the difference between two overlapped waves having very small frequency differences remain, and noise components due to the external disturbance cannot be completely removed.

Thus, when using a fingerprint sensor, if a device including a noise source having a frequency close to the sampling frequency of the capacitor detecting circuit, for example, the above-described inverted fluorescent light, is placed near the user, or if the fingerprint sensor is connected to a device having an inverter circuit used in backlight of a liquid crystal device, external disturbance noise caused by the above-described beat components cannot be completely eliminated. Accordingly, the signal-to-noise (S/N) ratio for detecting capacitance changes is reduced, thereby making it difficult to precisely read the fingerprint of the user.

SUMMARY OF THE INVENTION

Accordingly, in view of the above-described background, it is an object of the present invention to provide a capacitance detecting circuit and method in which the influence of external disturbance noise can be suppressed to improve the S/N ratio so that very small capacitances Cs and capacitance changes ΔCs of the capacitances Cs at intersections (sensor devices) between row lines and column lines can be detected at a sufficient sensitivity level, and also to provide a fingerprint sensor using the above-described capacitance detecting circuit and method.

In order to achieve the above object, according to one aspect of the present invention, there is provided a capacitance detecting circuit for detecting changes in capacitances at intersections between a plurality of row lines and a column line as voltages. The capacitance detecting circuit includes: a column-line driver for driving the column line; a code generator for generating code having orthogonality in chronological order; a selection synthesizer for selecting a certain number of row lines from the plurality of row lines by using the code and for synthesizing measured voltages at the intersections between the selected row lines and the driven column line so as to output the synthesized measured voltage in chronological order; and a decoding computation unit for separating the measured voltages corresponding to the capacitances at the intersections by performing product sum computation between the synthesized measured voltage and the code.

With this configuration, in the capacitance detecting circuit of the present invention, signals from a plurality of row lines interesting with a driven column line are synthesized by using code having orthogonality (pseudorandom noise (PN) code or orthogonal code, which is described below), and then the synthesized signal is output. More specifically, a plurality of sensor devices are simultaneously detected for each column line, and the capacitances Cs and the capacitance changes ΔCs to be detected are multiplexed, and the multiplexed values are changed as the capacitance N·Cs and N·ΔCs (N is the number of row lines simultaneously detected, i.e., the number of intersections multiplexed). The resulting capacitance is converted into a voltage as a detection signal. Accordingly, large capacitances and capacitance changes can be substantially measured. Thus, external disturbance noise, such as beat, can be relatively reduced so as to improve the S/N ratio, and the influence of crosstalk between the row lines can be excluded by using code exhibiting high autocorrelation.

Also in the capacitance detecting circuit of the present invention, the decoding computation unit decodes the multiplexed value into the capacitances Cs and the capacitance changes ΔCs of the individual sensor devices corresponding to the row lines by performing product sum computation (predetermined computation) by using the same code as the code used for multiplexing. Accordingly, the detection result can be obtained with a resolution level similar to that for detecting one row line.

In the capacitance detecting circuit of the present invention, the selection synthesizer may include: a row-line selector for dividing the plurality of row lines into a first row line group and a second row line group based on the code and for synthesizing the measured voltages for each of the first row line group and the second row line group so as to output the measured voltages as a first synthesized measured voltage and a second synthesized measured voltage, respectively; and a differential amplifier for differentially amplifying the first synthesized measured voltage and the second synthesized measured voltage so as to output a difference voltage between the first synthesized measured voltage and the second synthesized measured voltage corresponding to capacitances connected to the first row line group and the second row line group, respectively.

With this arrangement, the first synthesized measured voltage and the second synthesized measured voltage are differentially amplified so as to cancel out the in-phase components of external noise, thereby reducing the influence of external noise in the measured voltages. Additionally, a capacitance change can be obtained by amplifying the difference between the voltages, thereby increasing the dynamic range of the measured voltage.

The code generator may generate PN code having autocorrelation, and sequentially shifts the order of a bit string of the PN code so as to output the PN code out of phase with each other in chronological order as the code.

With this arrangement, in the capacitance detecting circuit of the present invention, M-series PN code having high autocorrelation is used as the code for performing the multiplexing of the row lines. Accordingly, by adding a plurality of signals, random external noise can be canceled out with each other. In decoding, the voltages corresponding to the capacitances at the intersections can be decoded merely by performing product sum computation of the multiplexed measured data and the code used for multiplexing. Thus, the voltages corresponding to the capacitance changes ΔCs can be obtained with a simple circuit configuration.

The code generator may generate Walsh orthogonal code having different orders of bit strings in chronological order so as to output the Walsh orthogonal code as the code.

With this arrangement, in the capacitance detecting circuit of the present invention, orthogonal code (Walsh code) having high orthogonality is used as the code for performing the multiplexing of the row lines. Accordingly, since adjacent row lines are not simultaneously driven, the influence of the adjacent row lines can be reduced. Thus, in decoding, a voltage corresponding to the capacitance change ΔCs can be obtained with less crosstalk.

The capacitor detecting circuit may be used for an area sensor in which the plurality of row lines and a plurality of column lines are disposed in a matrix to form intersections. Alternatively, the capacitor detecting circuit may be used for a line capacitor sensor in which one row line is associated with a plurality of column lines to detect the capacitances at the intersections. The capacitance detecting circuit can be used for a sensor for detecting the presence or absence or the roughness of the unevenness of the surface. Thus, the surface state of a subject can be detected with high precision.

In the capacitance detecting circuit of the present invention, the plurality of row lines may be divided into a plurality of row line groups, each having a predetermined number of row lines. The selection synthesizer may selectively change the plurality of row line groups at predetermined intervals in chronological order, and drives the selected row line group by dividing the row lines into the first row line group and the second row line group based on the code without driving the row lines of the unselected row line groups.

With this arrangement, the number of row lines to be subjected to product sum computation can be set as desired so that the computation load can be adjusted. Accordingly, the processing can be performed in accordance with the performance of a system used.

In the capacitance detecting circuit of the present invention, the number of row lines to be activated can be set as desired so as to set row line groups having the number of row lines to be activated. Thus, the operation can be performed in accordance with the power consumption of the apparatus.

The row line group may include the number of row lines smaller than the number of bits of the code, and the decoding computation unit may perform product sum computation by associating the row lines of the row line group with the bits at predetermined positions and by associating an imaginary row line with the remaining bit so as to decode the voltages corresponding to the capacitances at the intersections.

With this arrangement, measured data can be corrected by using the detection value of the imaginary row line, i.e., the reference value. Accordingly, in the measurements of the row line groups, information concerning DC components disappeared by complementary driving can be compensated for, and variations in the measured data in the row line groups can be adjusted. Thus, the uniformity at the intersections of the overall matrix can be maintained.

According to another aspect of the present invention, there is provided a fingerprint sensor including the above-described capacitance detecting circuit. In this fingerprint sensor, capacitance changes at the intersections (sensor devices) can be detected while eliminating external noise, thereby achieving fingerprint taking with high precision.

According to still another aspect of the present invention, there is provided a capacitance detecting method for detecting changes in capacitances at intersections between a plurality of row lines and a column line as voltages. The capacitance detecting method includes: a column-line driving step of driving the column line; a code generating step of generating orthogonal code in chronological order; a selection synthesizing step of selecting a certain number of row lines from the plurality of row lines by using the code and for synthesizing measured voltages at the intersections between the selected row lines and the driven column line so as to output the synthesized measured voltage in chronological order; and a decoding computation step of separating the measured voltages corresponding to the capacitances at the intersections by performing product sum computation between the synthesized measured voltage and the code.

As described above, according to the capacitance detecting circuit of the present invention, signals output from a plurality of row lines are simultaneously synthesized (multiplexed) by using PN code or orthogonal code, thereby detecting the added capacitance of the capacitance changes at the plurality of intersections. Accordingly, the influence of external disturbance noise superposed on the row lines can be relatively reduced, thereby improving the detection sensitivity. Meanwhile, decoding is performed by using the same PN code or orthogonal code as the same code used for multiplexing so as to determine the capacitance changes as the voltages at the intersections. Accordingly, the capacitance changes at the intersections can be detected with a resolution level similar to that for detecting the signal output form a single row line.

BRIEF DESCRIPTION OF THE DRAWINGS

FIGS. 8A and 8B schematically illustrate autocorrelation of bit strings of pseudorandom noise (PN) code in every cycle as a result of performing bit shift (phase shift);

FIG. 14 schematically illustrates a process for generating Walsh code, which is typical orthogonal code;

FIG. 15 is a table indicating Walsh code stored in a code memory shown in FIG. 12;

FIG. 18 schematically illustrates product sum computation as decoding computation performed by a decoding computation circuit according to a fifth embodiment of the present invention.

DESCRIPTION OF THE PREFERRED EMBODIMENTS

The present invention is described in detail below with reference to the accompanying drawings through illustration of preferred embodiments.

First Embodiment

A capacitor detecting circuit constructed in accordance with a first embodiment of the present invention is discussed below with reference to FIG. 1.

A code generator 1 generates pseudorandom noise (PN) code used for generating a control signal for selecting row lines (for example, 15 row lines) forming a row line set 3 of a sensor unit 4. As the PN code, M-series PN code having high autocorrelation is used.

The code generator 1 also outputs a control signal corresponding to the order of a bit string of the PN code to a row-line switch circuit 8 that switches the row lines of the row line set 3 so that the row line set 3 is divided into two row line groups based on the PN code.

The row-line switch circuit 8 assigns, based on the control signal, the row lines to a positive-level row line group when the bit data of the bit string of the PN code is 1 and to be a negative-level row line group when the bit data is 0. In other words, the row-line switch circuit 8 synthesizes (multiplexes) the currents flowing in the capacitors in the selected row lines of the sensor unit 4.

Figure 4:
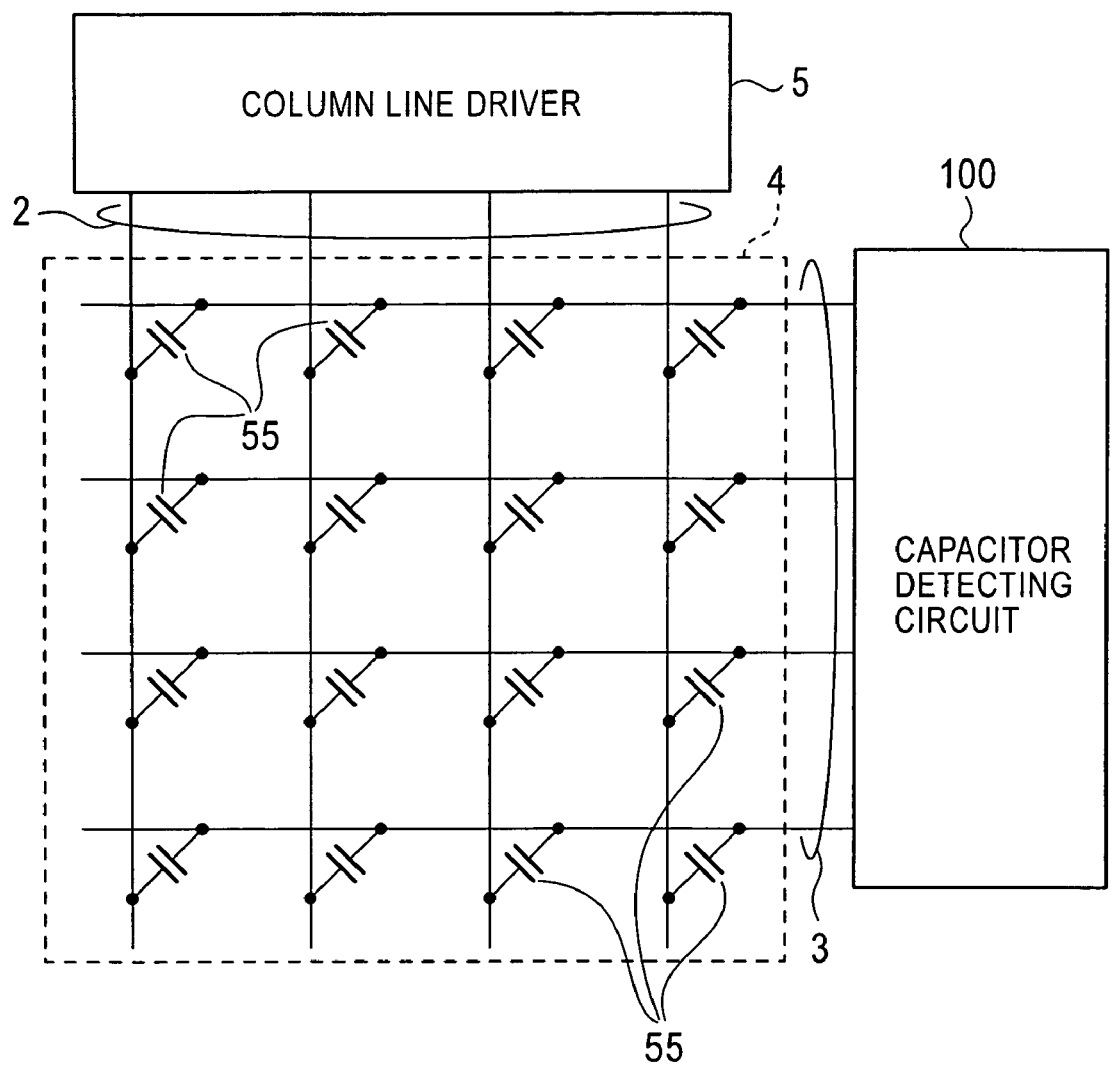
FIG. 4 schematically illustrates the configuration of sensor devices formed at the intersections of row lines of a row line set and column lines of a column line set in the sensor unit.

In the sensor unit 4, a plurality of row lines and a plurality of column lines intersect with each other in a matrix, and the intersections of the corresponding lines form sensor devices (sensor devices 55 in FIG. 4).

Figure 2A:
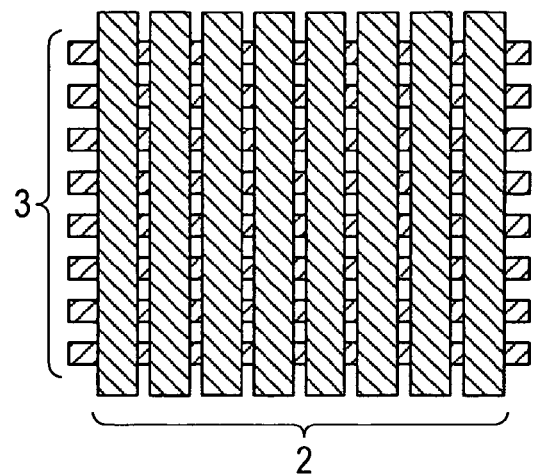
FIGS. 2A and 2B are a plan view and a sectional view, respectively, illustrating a sensor unit, which serves as an area sensor, shown in FIG. 1.
Figure 2B:
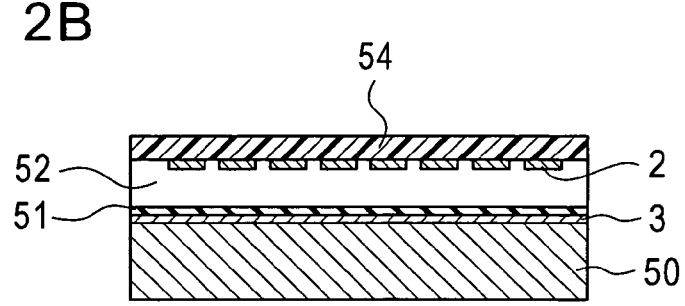

FIGS. 2A and 2B are a plan view and a sectional view, respectively, illustrating the sensor unit 4. As shown in FIG. 2A, the row lines of the row line set 3 and the column lines of a column line set 2 intersect with each other at a pitch of, for example, 50 µm. As shown in FIG. 2B, the row line set 3 consisting of a plurality or row lines are disposed on a substrate 50. An insulating film 51 is laminated on the surface of the row line set 3, and a film 54 is disposed on the surface of the insulating film 51 with a gap 52 therebetween. The column line set 2 is disposed on the lower surface of the film 54. The sensor devices 55 are formed as capacitor devices having a predetermined capacitance at the intersections between the row lines of the row line set 3 and the column lines of the column line set 2 with the gap 52 and the insulating film 51 therebetween.

Figure 3:
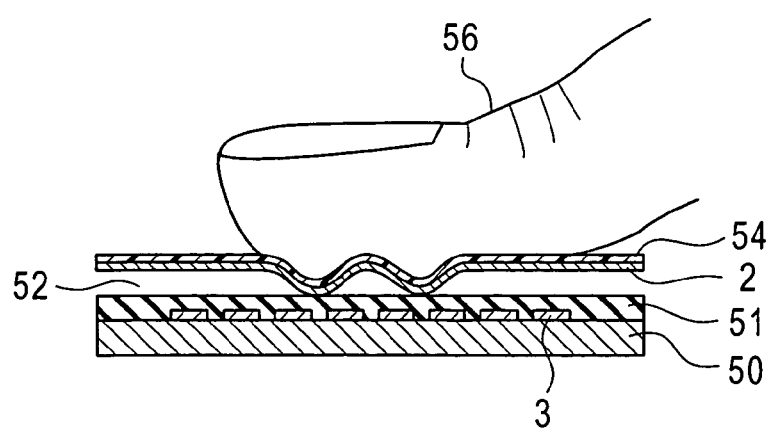
FIG. 3 schematically illustrates measurements of fingerprint data by using the sensor unit shown in FIG. 1.

When a finger 56 is placed on the sensor unit 4, the shapes of the film 54 and the column lines of the column line set 2 are changed, as shown in FIG. 3, in accordance with the ridges and valleys of the finger 56, and the gap 52 is changed accordingly. Then, the capacitances of the sensor devices 55 formed at the intersections between the row line set 3 and the column line set 2 are changed.

FIG. 4 schematically illustrates the matrix of the capacitor devices between the row lines and the column lines of the sensor unit 4. The sensor unit 4 is formed of the sensor devices 55, and a column line driver 5 and a capacitor detecting circuit 100 are connected to the sensor unit 4. The column line driver 5 sequentially drives the column lines of the column line set 2 one by one in chronological order by a drive pulse having a predetermined pulse width. The capacitor detecting circuit 100 includes, as shown in FIG. 1, the code generator 1, a differential detecting circuit 6, a sample-and-hold circuit 7, the row-line switch circuit 8, an analog-to-digital (A/D) converter 9, a decoding computation circuit 10, and a timing control circuit 11.

Details of the capacitor detecting circuit 100 are given below. The row-line switch circuit 8 selects a plurality of row lines of the row line set 3 according to a pulse train of the above-described control signal. More specifically, the row-line switch circuit 8 selects the row lines based on data 1 and data 0 in the bit string of the PN code according to the pulse train of the bit string, and divides the row lines of the row line set 3 into two row line groups, i.e., the positive-level row line group (corresponding to data 1) and the negative-level row line group (corresponding to data 0). That is, the row-line switch circuit 8 multiplexes capacitances at the intersections (sensor devices) between the row lines (positive-level row lines and negative-level row lines) and the column line.

In the row-line switch circuit 8, switches $SW_1$ through $SW_{15}$ are connected to the row lines R1 through R15, respectively, as shown in FIG. 5, and switch the row lines R1 through R15 to a positive (+) terminal or a negative (−) terminal according to the pulse train data of the control signal, i.e., the bit data of the bit string of the PN code. The row-line switch circuit 8 connects row lines to the negative (−) terminal when the bit data of the bit string of the PN code is 1 and connects row lines to the positive (+) terminal when the bit data is 0.

FIG. 5 shows that the row line R1 is connected to the switch $SW_1$, the row line R2 is connected to the switch $SW_2$, and so on so that the row-line switch circuit 8 can control the row lines to connect to the positive (+) terminal or the negative (−) terminal according to the PN code.

The switch $SW_1$ is connected to the row line R1 in accordance with the least significant bit (LSB) of the bit string of the PN code, the switch $SW_2$ is connected to the row line R2 in accordance with the second bit from the LSB, . . . , and the switch $SW_{15}$ is connected to the row line R15 in accordance with the most significant bit (MSB) of the bit string, that is, the switches SW are controlled based on the corresponding bit data of the bit string of the PN code.

The switches $SW_1$ through $SW_{15}$ are provided with registers $23_1, 23_2, \ldots,$ and $23_{15}$ for storing data in units of bit units, and these registers $23_1$ through $23_{15}$ form a storage shift register 23.

The code generator 1 outputs the bit string of the PN code to the row-line switch circuit 8, that is, the storage shift register 13, as, for example, serial data.

The differential detecting circuit 6 determines the amount by which electric charge is transferred (current difference) by a column line, as the voltage signal difference, according to the capacitance at the intersection (sensor device) between each of the positive/negative-level row lines and the corresponding column line.

The positive/negative-level row lines are connected to the corresponding switches in the row-line switch circuit 8 according to the PN code stored in the built-in storage registers 23, that is, the capacitances at the intersections between the positive/negative-level row lines and the corresponding column line are multiplexed.

More specifically, the row-line switch circuit 8 selectively allocates charging/discharging currents (very small amounts by which electric charge is transferred) corresponding to the capacitances at the intersections between a driven column line and the corresponding row lines to the positive/negative-level row lines so as to multiplex the currents, and adds the currents at the individual intersections. The row-line switch circuit 8 then amplifies the added current, converts it into a voltage, and outputs it as a detection signal (measured voltage).

The sample-and-hold circuit 7 samples the measured voltages of the detection signals sequentially output from the differential detecting circuit 6 in response to the input of a sample-and-hold signal (S/H signal), and temporarily holds the measured voltages as voltage information. In the sample-and-hold circuit 7, every time data is input into the storage shift register 23 of the row-line switch circuit 8 to change the PN code, an S/H signal is input into the sample-and-hold circuit 7 to temporarily store a detection signal to be generated as a new bit string.

The A/D converter 9 converts the measured voltage, which serves as analog voltage information, into digital measured data in synchronization with an A/D clock input from the decoding computation circuit 10, and outputs the digital data to the decoding computation circuit 10.

The decoding computation circuit 10 performs computation on the digital measured data for removing offset components caused by the feedthrough by determining the difference between the measured data when the sensor device at the intersection is charged and the measured data when the sensor device is discharged. The decoding computation circuit 10 also decodes the multiplexed signal by performing product sum computation by using the same PN code as the PN code used for coding so as to demultiplex the multiplexed signal into voltage data components indicating the changed capacitances of the sensor devices.

In response to the input of a start signal indicating the start of the detection of capacitances from the decoding computation circuit 10, the timing control circuit 11 outputs clocks and control signals to the code generator 1, the column line driver 5, the differential detecting circuit 6, the sample-and-hold circuit 7, and the row-line switch circuit 8, thereby controlling the operation timing of the overall capacitance detecting circuit 100.

Figure 6:
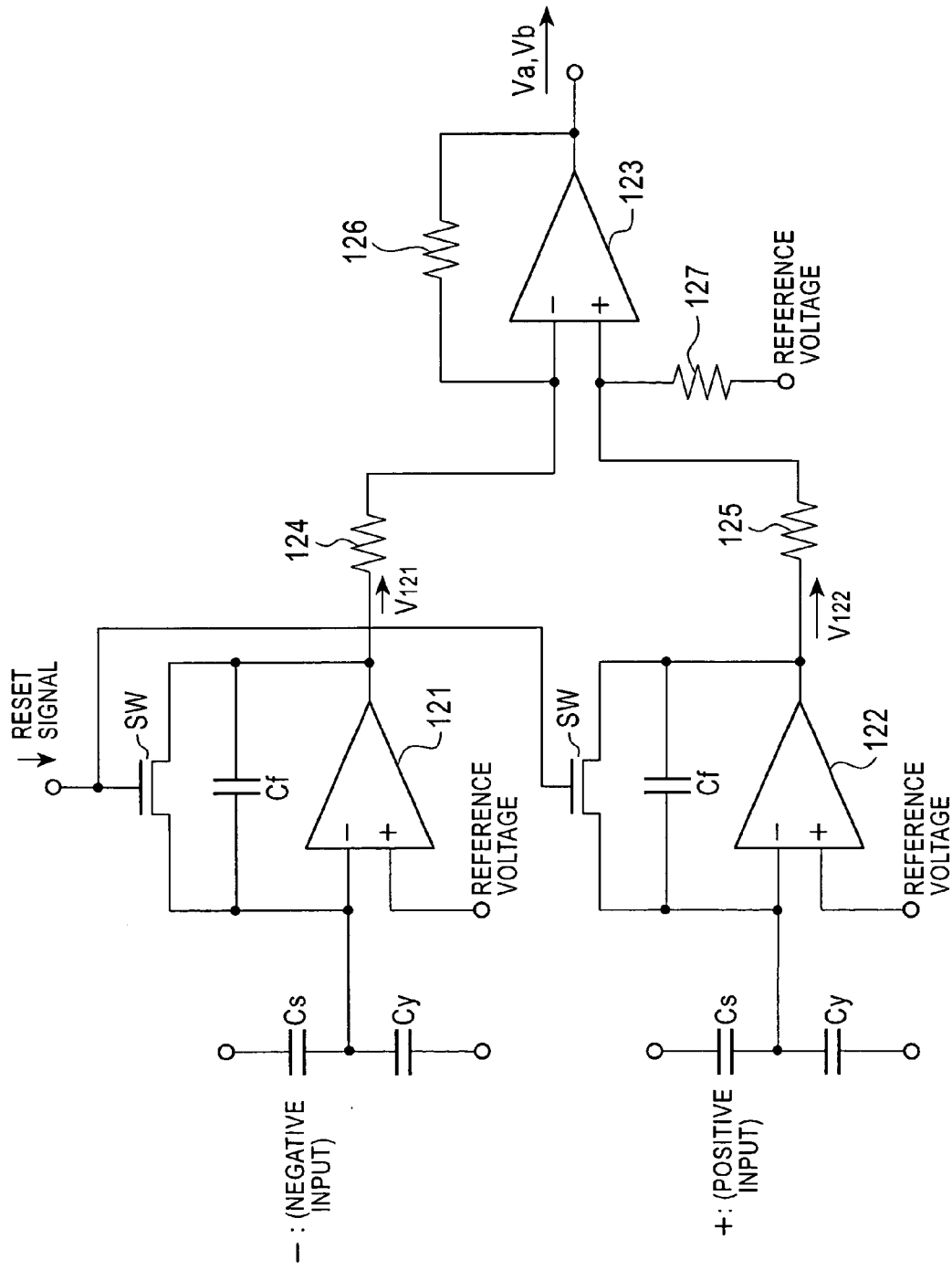
FIG. 6 schematically illustrates the configuration of a differential detecting circuit shown in FIG. 1.

The configuration of the differential detecting circuit 6 is discussed below with reference to FIG. 6. The differential detecting circuit 6 includes, as shown in FIG. 6, operational amplifiers 121, 122, and 123. The operational amplifiers 121 and 122 is each formed of a feedback capacitor Cf connected between the inverting input terminal and the output terminal and an analog switch SW for discharging electric charge stored in the feedback capacitor Cf. The non-inverting input terminal of each of the operational amplifiers 121 and 122 is connected to a reference potential.

The row lines selected as the positive-level row line group are connected to the inverting input terminal of the operational amplifier 121, and the row lines selected as the negative-level row line group are connected to the inverting input terminal of the operational amplifier 122.

In FIG. 6, Cs represents the total of the capacitances of the sensor devices at the intersections between the driven column line and the row lines, and Cy designates the total of the capacitances of the sensor devices corresponding to the column lines other than the driven column line.

The inverting input terminal of the operational amplifier 123 is connected to the output terminal of the operational amplifier 121 via a resistor 124, and the non-inverting input terminal of the operational amplifier 123 is connected to the output terminal of the operational amplifier 122 via a resistor 125. The non-inverting input terminal of the operational amplifier 123 is connected to a reference voltage via a resistor 127, and the inverting input terminal of the operation amplifier 123 is connected to the output terminal via a resistor 126. The operational amplifier 123 differentially amplifies the output current between the operational amplifiers 121 and 122 based on the amplification factors set by the resistors 124, 125, 126, and 127.

An example of the operation of the capacitor detecting circuit 100 configured as described above is described below with reference to FIG. 1. For the sake of simplicity, in this operation, it is assumed that 15-bit length PN code is generated by a PN-code generating circuit 20, which is discussed below.

A signal indicating that the detection of capacitances is started, i.e., a fingerprint is to be taken by using the fingerprint sensor (sensor unit 4), is input into the decoding computation circuit 10.

The decoding computation circuit 10 outputs a start signal instructing the timing control circuit 11 to start detection. Then, the timing control circuit 11 outputs a clock signal and a reset signal to the code generator 1.

The code generator 1 then initializes a built-in four-stage linear feedback shift register (LFSR) by the reset signal, and generates M-series PN codes in synchronization with the clock signal and sequentially outputs them.

Figure 7A:
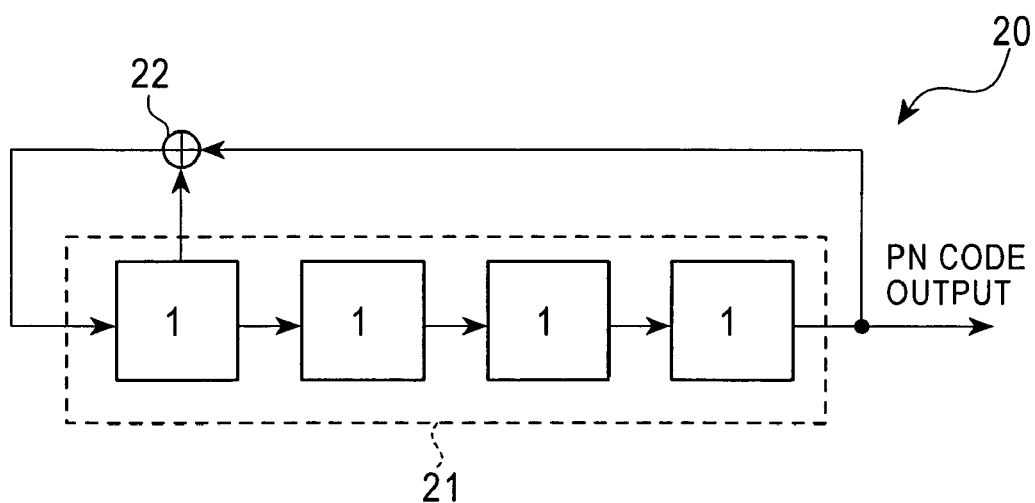
FIG. 7A illustrates the configuration of a code generating circuit of a code generator shown in FIG. 1.

The code generator 1 includes, for example, the PN-code generating circuit 20 shown in FIG. 7A, and outputs M-series PN code in synchronization with the clock. More specifically, the PN-code generating circuit 20 (also referred to as the "LFSR"), which generates M-series 15-bit PN code, is formed of a four-bit shift register 21 and an exclusive OR (hereinafter referred to as "EXOR") 22. The EXOR 22, which is connected to the output of tap 1 (the output of the first bit of the shift register 21) and the output of tap 4 (the output of the fourth bit of the shift register 21), performs an exclusive-OR operation on the input numerical values and outputs the computation results to the input of the shift register 21.

Figure 7B:
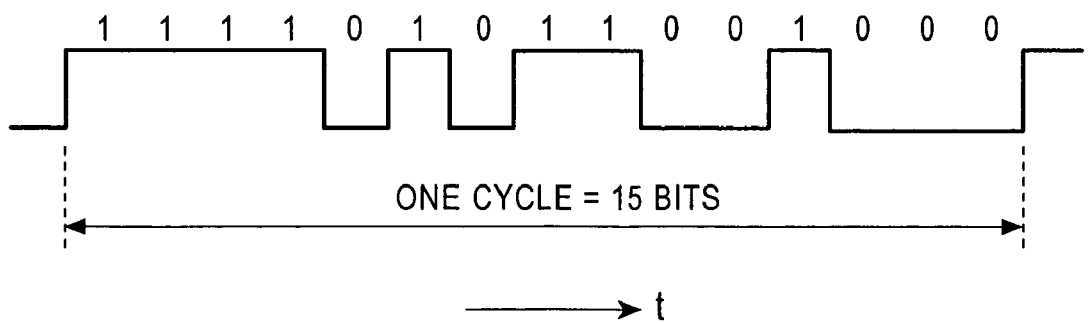
FIG. 7B illustrates an example of a data string of the code generated by the code generating circuit shown in FIG. 7A.

The PN-code generating circuit 20 shifts the bit data of the shift register 21 in synchronization with the clock signal so as to sequentially generate the bit string data of the PN code in chronological order in synchronization with the clock signal. The PN-code generating circuit 20 then writes the bit string data in the order of {1 (LSB), 1, 1, 1, 0, 1, 0, 1, 1, 0, 0, 1, 0, 0, 0 (MSB)} (in chronological order from the left to the right in FIG. 7B), as shown in FIG. 7B, into the storage shift register 23 in the row-line switch circuit 8 in chronological order in synchronization with the clock signal. That is, the PN-code generating circuit 20 outputs the PN code in the order from the LSB to the MSB in chronological order.

If the bit data is shifted in the cycle of 15 bits, as shown in FIG. 8A, i.e., if the bit string of the PN code has 15 bits, the maximum number of auto-correlated bits is +15 in every cycle in which the bit strings are in phase with each other, and the minimum number of auto-correlated bits is −1. In FIG. 8A, the vertical axis indicates autocorrelation (the number of auto-correlated bits (bits having the same signs), and the horizontal axis represents the bit number of the phase shift (one cycle of 15-bit shift). In the phase shift, bits are shifted from the initial bit string of PN code without rearranging the order of bits.

The PN-code bit string is compared, as shown in FIG. 8B, with a bit string generated by cyclically shifting the same PN-code bit string. When the two PN-code bit strings are in phase with each other, the number of auto-correlated bits computed by product sum processing is maximized (+15). In contrast, if the two PN-code bit strings are out of phase with each other, the number of auto-correlated bits computed by product sum processing is decreased one by one and is reduced to −1. The characteristic of this PN code is similar to the principle of multiplexing/demultiplexing in code division multiple access (CDMA) used in cellular telephones in which multiplexed information can be demultiplexed by using product sum computation when decoding it.

Figure 5A:
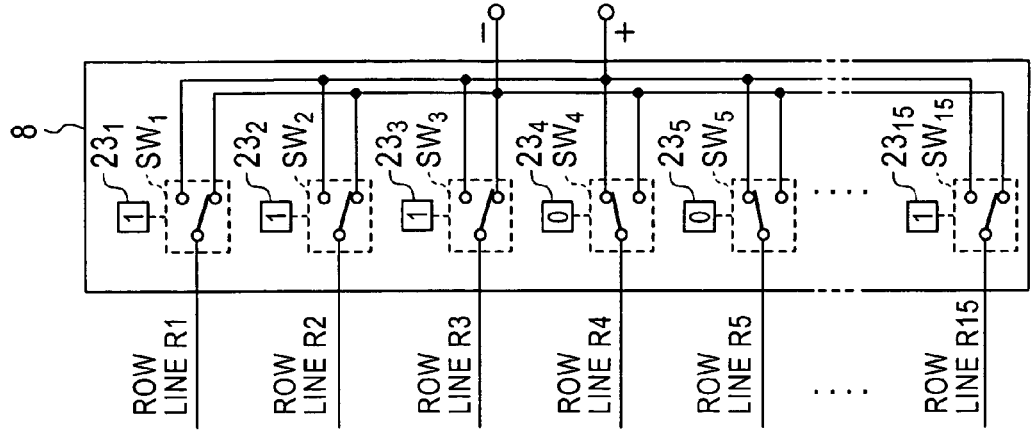
FIGS. 5A, 5B, and 5C illustrate an example of the operation of a row-line switch circuit for multiplexing row lines by using code.

Then, the column line driver 5 sequentially drives the column lines. In this case, when one column line is driven, the following processing is performed. The row-line switch circuit 8 divides, as shown in FIG. 5A, the plurality of row lines of the row line set 3 into the positive-level row line group and the negative-level row line group in accordance with the PN code output from the PN generator 1 so as to multiplex the measured voltages in the row lines.

Figure 9:
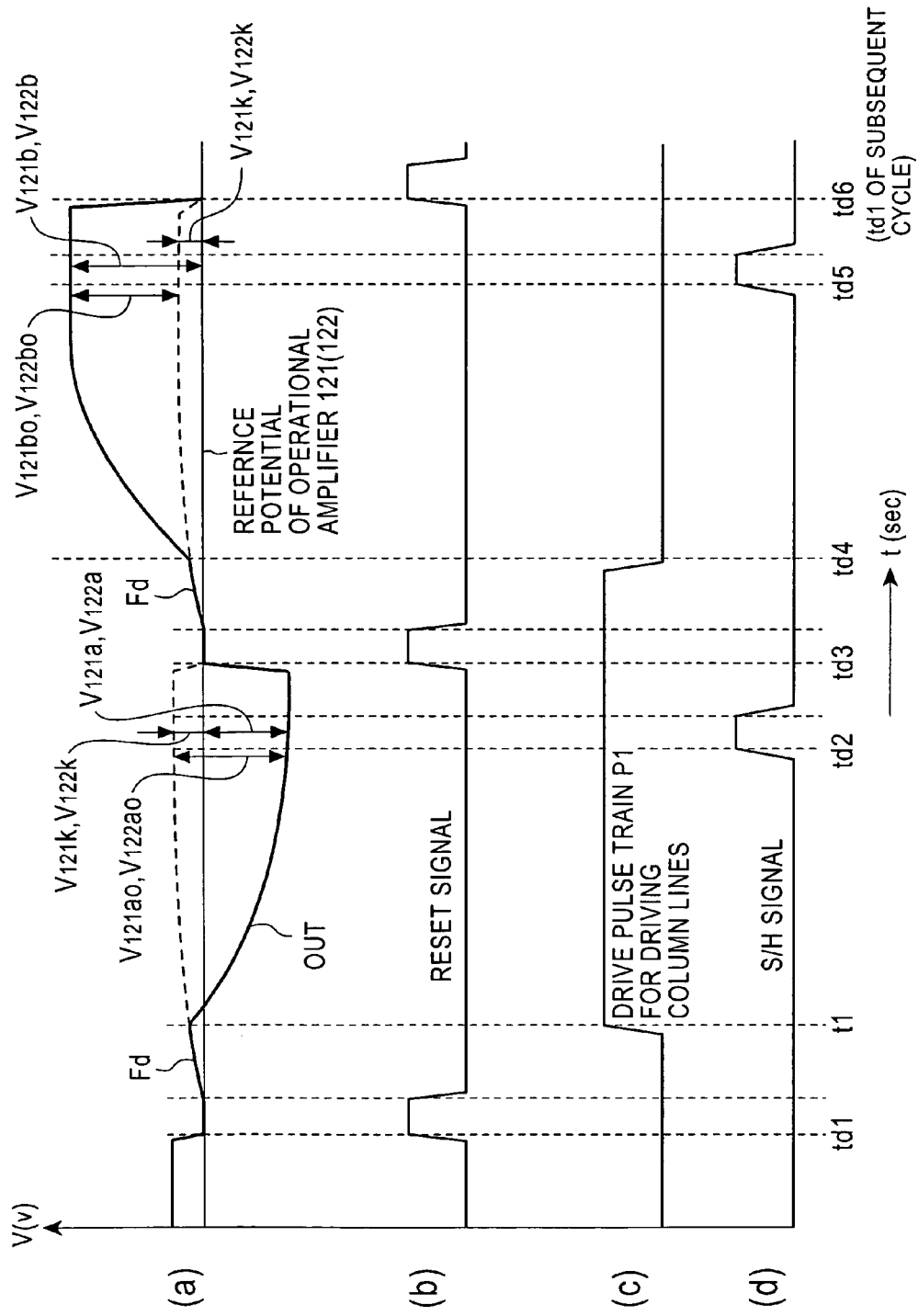
FIG. 9 is a timing chart illustrating the operation of the differential detecting circuit shown in FIG. 1.

More specifically, if the PN code is {1 (LSB), 1, 1, 1, 0, 1, 0, 1, 1, 0, 0, 1, 0, 0, 0 (MSB)}, as shown in FIG. 9, one cycle of the PN-code bit string consists of times t1 through t15 with regular intervals during which the bits are shifted in chronological order. Then, the PN-code bit string {1, 1, 1, 1, 0, 1, 0, 1, 1, 0, 0, 1, 0, 0, 0} generated by the PN-code generating circuit 20 is shifted in the storage shift register 23 in the row-line switch circuit 8.

The storage shift register 23 has 15 registers, i.e., the registers $23_1$ through $23_{15}$ for storing one-bit data, and the data is shifted from the top (register $23_1$) to the bottom (register $23_{15}$). More specifically, at time t1, the first bit (LSB) 1 of the PN-code bit string is input into the topmost register $23_1$ of the storage shift register 23. Then, at time t2, the first bit 1 is shifted to the register $23_2$, and the second bit 1 of the PN-code bit string is input into the register $23_1$.

As a result of performing the above-described operation at time t1, t2, . . . , and t15, the PN-code bit string {1, 1, 1, 1, 0, 1, 0, 1, 1, 0, 0, 1, 0, 0, 0} can be circulated in the registers $23_{15}$, $23_{14}$, $23_{13}$, $23_{12}$, $23_{11}$, $23_{10}$, $23_9$, $23_8$, $23_7$, $23_6$, $23_5$, $23_4$, $23_3$, $23_2$, and $23_1$. The data stored in the registers $23_{15}$, $23_{14}$, $23_{13}$, $23_{12}$, $23_{11}$, $23_{10}$, $23_9$, $23_8$, $23_7$, $23_6$, $23_5$, $23_4$, $23_3$, $23_2$, and $23_1$ change the connection of the switches $SW_1$ through $SW_{15}$ to the corresponding row lines R1 through R15, respectively, of the row line set 3. At the initial time before starting the shifting operation (t1 through t15) and the time at the end of the shifting operation, the PN-code bit string {1, 1, 1, 1, 0, 1, 0, 1, 1, 0, 0, 1, 0, 0, 0} is stored in the order of the registers $23_{15}$ through $23_1$. In the fingerprint-taking operation, the cycle from t1 to t15 corresponds to one cycle in which multiplexing processing of the row lines is performed every time a column line is driven.

The operation of the storage shift register 23 in the actual fingerprint-taking operation is as follows. In response to a signal indicating the start of fingerprint taking, 15 clock signals are output from the timing control circuit 11, and the control signal based on the PN code is input into the row-line switch circuit 8 from the code generator 1. As the initial state, the data string {1, 1, 1, 1, 0, 1, 0, 1, 1, 0, 0, 1, 0, 0, 0} is set in the registers $23_{15}$ through $23_1$ of the storage shift register 23.

Then, at time t1 at the start of the cycle of the multiplexing processing, the timing control circuit 11 outputs a clock so as to shift the registers $23_{15}$ through $23_1$ by one bit, resulting in the data string {1, 1, 1, 0, 1, 0, 1, 1, 0, 0, 1, 0, 0, 0, 1}, as shown in FIG. 5A.

Then, the column line driver 5 drives a column line C1, based on the clock signal output from the timing control circuit 11, by a drive pulse P1 (synchronizing with the time t1) having a predetermined pulse width (see (c) of FIG. 9) by using a driver circuit provided for each column line.

Simultaneously, during the period of the drive pulse P1, the row-line switch circuit 8 multiplexes the row lines corresponding to bit data 1 as the positive-level row line group and also multiplexes the row lines corresponding to bit data 0 as the negative-level row line group in accordance with the PN-code bit string (data string).

Accordingly, at time t1, in synchronization with a predetermined period during which the drive pulse P1 is applied, the row lines R1, R5, R8, R9, R11, R13, R14, and R15 are multiplexed as the positive-level row line group and are connected to the inverting input terminal of the operational amplifier 121, while the row lines R2, R3, R4, R6, R7, R10, and R12 are multiplexed as the negative-level row line group and are connected to the inverting input terminal of the operational amplifier 122.

Figure 10:
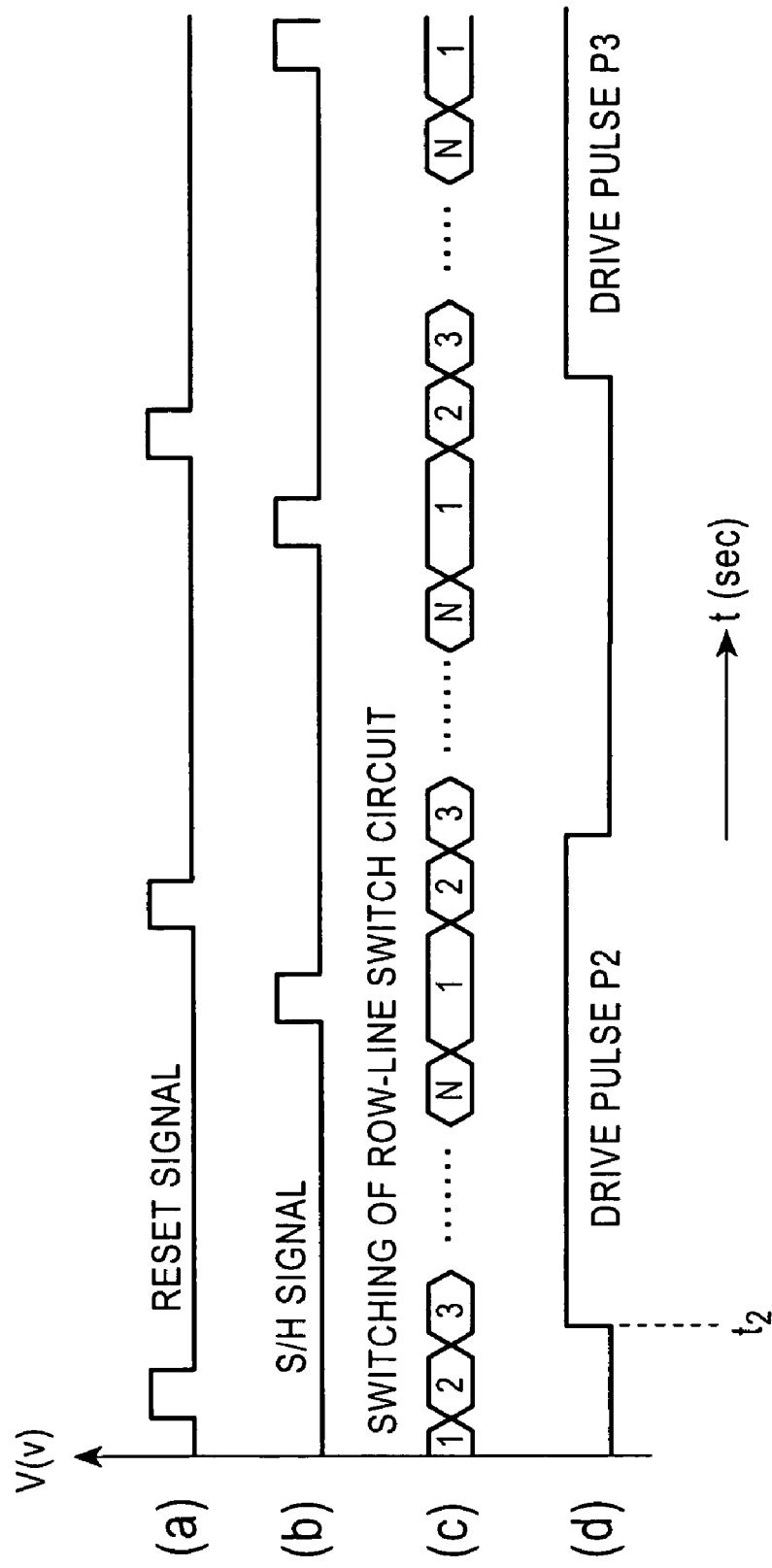
FIG. 10 is a timing chart illustrating the operation for controlling the selectors and column lines in the embodiments of the present invention.

In this case, the timing control circuit 11 outputs, as indicated by (b) of FIG. 9 and (a) of FIG. 10, a reset signal to the differential detecting circuit 6 slightly before the rise and slightly before the fall of the drive pulse for driving the column line. The timing control circuit 11 also outputs, as indicated by (d) of FIG. 9 and (b) of FIG. 10, a sample-and-hold (S/H) signal to the sample-and-hold circuit 7 slightly before the fall of the reset signal.

The timing control circuit 11 outputs an S/H signal to the sample-and-hold circuit 7 in synchronization with a change in the order of the data string in the storage register 23 of the row-line switch circuit 8 and with the input timing of a drive pulse. Accordingly, the measured voltage held in the sample-and-hold circuit 7 by one S/H signal is supplied, as indicated by (c) of FIG. 10, to the A/D converter 9 before the subsequent S/H signal is input. Then, the A/D converter 9 converts the measured voltage for each drive pulse into digital data based on an A/D clock output from the decoding computation circuit 10, and outputs the digital data of each row line to the decoding computation circuit 10 as measured data d1. The decoding computation circuit 10 then writes the data string of the measured data in chronological order into the built-in memory.

When the order of data string (bit string) in the storage shift register 23 of the row-line switch circuit 8 is changed in one cycle, a drive pulse is supplied to each column line of the sensor unit 4 from the column line driver 5.

Details of the operation of the differential detecting circuit 6 are given below. In response to a reset signal output from the timing control circuit 11 at time td1, which is slightly before time t1 shown in FIG. 9, the analog switches SW (MOS transistors in FIG. 6) are turned ON to discharge the feedback capacitors Cf. This causes the output terminals of the operational amplifiers 121 and 122 to be short-circuited with the inverting input terminals thereof, and thus, the operational amplifiers 121 and 122 become at the reference potential. The row lines of the positive-level row line group and the negative-level row line group connected to the inverting input terminals of the operational amplifiers 121 and 122 also become at the reference potential.

Then, when the reset signal is turned OFF, the output voltages of the operational amplifiers 121 and 122 are slightly raised due to the feedthrough of the gate parasitic capacitances of the analog switches SW (see Fd after time td1 in (a) of FIG. 9).

Then, at time t1, at the rise of the drive pulse P1 applied to the column line C1, the drive pulse P1 is applied to the inverting input terminals of the operational amplifier 121 or 122 via the sensor devices (capacitance Cs) at the intersections of the column line C1 and the corresponding row lines. Due to the current flowing based on the voltage of this drive pulse P1, the voltages of the output terminals of the operational amplifiers 121 and 122 are gradually reduced, as indicated in (a) of FIG. 9.

Simultaneously, the operational amplifier 123 differentially amplifies the currents (voltages) from the output terminals of the operational amplifiers 121 and 122, and outputs the difference voltage from the output terminal as the measured voltage.

Then, at time td2, the timing control circuit 11 outputs an S/H signal to the sample-and-hold circuit 7. In response to the S/H signal, the sample-and-hold circuit 7 holds the measured voltage Va (voltage obtained by differentially amplifying the output voltages of the operational amplifiers 121 and 122) output from the output terminal of the operational amplifier 123.

It is noted that the measured voltage Va is obtained as a result of differentially amplifying the output voltage $V_{121}$ of the operational amplifier 121 and the output voltage $V_{122}$ of the operational amplifier 122.

Then, at time td3, the timing control circuit 11 again outputs a reset signal to the differential detecting circuit 6. This causes the output terminals of the operational amplifiers 121 and 122 to be short-circuited with the inverting input terminals, and the feedback capacitors Cf are discharged, thereby allowing the output terminals of the operational amplifiers 121 and 122 to return to the reference potential. When the reset signal is turned OFF, as stated above, due to the feedthrough of the gate parasitic capacitances of the analog switches SW, the output voltages of the operational amplifiers 121 and 122 are slightly raised, and the differentially amplified offset voltage is added to the measured voltage Va (see Fd after time td3 in (a) of FIG. 9).

Then, at time td4, at the fall of the drive pulse P1, the column line driven by the drive pulse P1 and the sensor devices (capacitance Cs) at the intersections between the column line and the corresponding row lines are discharged by the current based on the voltage of the drive pulse, and accordingly, the output OUT of the operational amplifier 121 (122) is gradually raised.

Then, at time td5, the timing control circuit 11 outputs an S/H signal to the sample-and-hold circuit 7. In response to the S/H signal, the sample-and-hold circuit 7 holds the measured voltage Vb output from the output terminal of the operational amplifier 123.

Then, at time td6 (td1 of time t2 of the subsequent cycle), the timing control circuit 11 outputs a reset signal to the differential detecting circuit 6. This causes the output terminals of the operational amplifiers 121 and 122 to be short-circuited with the inverting input terminals, and the feedback capacitors Cf are discharged, allowing the output terminals of the operational amplifiers 121 and 122 to return to the reference potential. Thus, the output of the operational amplifier 123 is also returned to the reference potential. Thereafter, the above-described operation is repeated.

In the above-described measurements, when the output terminals of the operational amplifiers 121 and 122 rise or fall from the reference potential, the offset voltage Vk due to the feedthrough current of the analog switches SW is generated in the +direction. As a result, the offset components Vok based on the offset voltage Vk of the operational amplifiers 121 and 122 are contained in the measured voltages Va and Vb. As in this embodiment, when the capacitance Cs to be detected is several dozens to several hundred fF (femtofarads), the offsets caused by the feedthrough current cannot be ignored. In the measurements of the operational amplifier 121 (the voltage measured at the rise of the voltages V121$a$ and V122$a$ and at the fall of the voltages Vb121$b$ and V122$b$), the resulting voltage proportional to the capacitance Cs is:

$$-V121a0 = -V121a + V121k.$$

In this case, the voltage V121$a$ contains an error V121$k$ due to the offset voltage.

$$V121a = V121a0 + V121k$$

Accordingly, in this embodiment, the voltage Vb when the capacitance Cs is discharged is also measured. The voltage proportional to the capacitance Cs is:

$$V121b0 = V121b - V121k.$$

In this case, the voltage V121$b$ to be measured is:

$$V121b = V121b0 + V121k.$$

The same applies to the operational amplifier 122. That is, the voltages V122$a$ and V122$b$ contain an error V122$k$ due to the offset voltage, as indicated by the following equations.

$$V122a = V122a0 + V122k$$

$$V122b = V122b0 + V122k$$

The measured voltage Va obtained by differentially amplifying the voltages V121$a$ and V122$a$ and the measured voltage Vb obtained by differentially amplifying the voltages V121$b$ and V122$b$ are sequentially held in the sample-and-hold circuit 7. Then, the held voltage is converted into a digital voltage by the A/D converter 9 every time the measured voltage Va or Vb is output from the operational amplifier 123 at the rise or fall of the drive pulse, and the converted voltage is stored in the memory in the decoding computation circuit 10. Then, the decoding computation circuit 10 performs computation according to the following equation:

$$d = Vb - Va = (Vb0 + Vk) - (Va0 + Vk) = Vb0 - Va0$$

where Va = a(V121$a$−V122$a$) and Vb = a(V121$b$−V122$b$), and Vk represents an error based on the offset voltages V121$k$ and V122$k$. As a result, measured data without offset errors, i.e., measured data d corresponding to the multiplexed capacitance, can be obtained.

As described above, the decoding computation circuit 10 determines the difference between the output signals of the differential detecting circuit 6 at the rise and at the fall of the potential of the column line in response to the rise and the fall of the drive pulse. Accordingly, the decoding computation circuit 10 can measure the capacitance of the sensor devices (intersections) without being influenced by the feedthrough.

The differential detecting circuit 6 converts the currents flowing in the positive-level row line group and in the negative-level row line group output from the row-line switch circuit 8 into voltages, and the operational amplifier 123 differentially amplifies the output voltages of the operational amplifiers 121 and 122.

Therefore, in the capacitor detecting circuit 100 of the present invention used in, for example, a fingerprint sensor, since external noise transmitting from a human body is mainly input as in-phase components, it is canceled out by the difference of the output voltages of the operational amplifiers 121 and 122, thereby reducing the influence of external noise.

At time t2, which corresponds to the measurement by the drive pulse P2 after shifting the bit string by one in FIG. 10 and to the time before the rise of the drive pulse P2 indicated in (d) of FIG. 10, the timing control circuit 11 outputs a clock to the code generator 1. In response to this clock, in the code generator 1, the shift register 21 is shifted by one bit to generate data 1, and outputs it to the storage shift register 23 of the row-line switch circuit 8.

Then, the storage shift register 23 shifts the stored PN-code bit string {1, 1, 1, 0, 1, 0, 1, 1, 0, 0, 1, 0, 0, 0, 1} by one bit in synchronization with the above clock, and also writes the data 1 input from the shift register 21 into the register $23_1$. Then, the data 1 stored in the register $23_{15}$ is moved out from the storage shift register 23 and is erased, and the data 1 stored in the register $23_{14}$ is written into the register $23_{15}$.

Figure 5B:
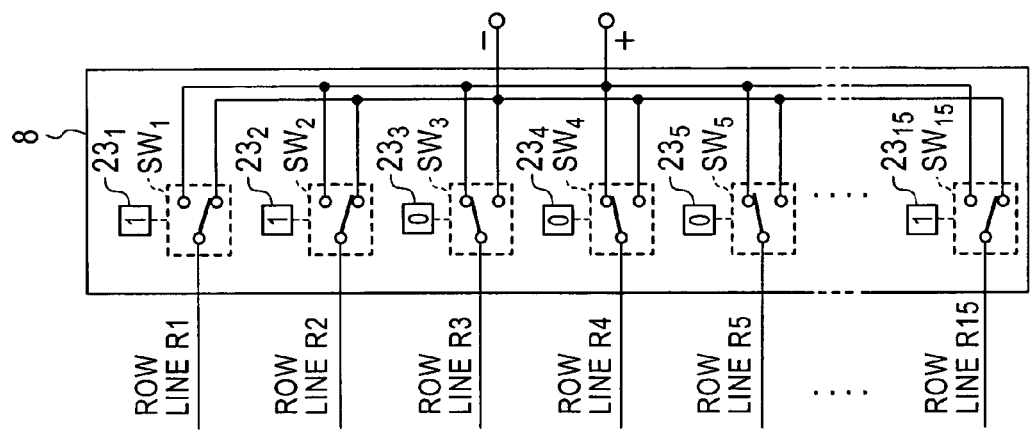
Figure 5C:
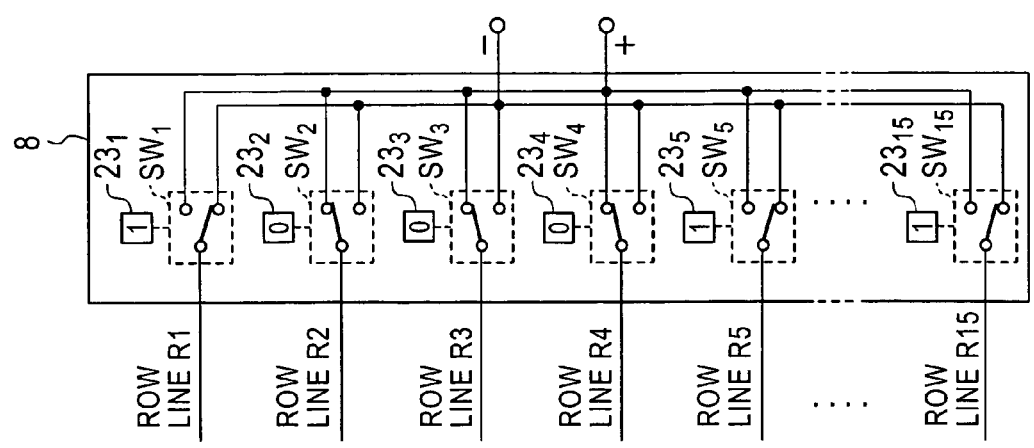

Accordingly, the data stored in the registers $23_{15}$, $23_{14}$, $23_{13}$, $23_{12}$, $23_{11}$, $23_{10}$, $23_9$, $23_8$, $23_7$, $23_6$, $23_5$, $23_4$, $23_3$, $23_2$, and $23_1$ results in, as shown in FIG. 5B, the bit string {1, 1, 0, 1, 0, 1, 1, 0, 0, 1, 0, 0, 0, 1, 1}. Then, the outputs of the registers $23_{15}$, $23_{14}$, $23_{13}$, $23_{12}$, $23_{11}$, $23_{10}$, $23_9$, $23_8$, $23_7$, $23_6$, $23_5$, $23_4$, $23_3$, $23_2$, and $23_1$ are supplied to the switches $SW_{15}$, $SW_{14}$, $SW_{13}$, $SW_{12}$, $SW_{11}$, $SW_{10}$, $SW_9$, $SW_8$, $SW_7$, $SW_6$, $SW_5$, $SW_4$, $SW_3$, $SW_2$, and $SW_1$, respectively, of the row-line switch circuit 8. Thus, at the end of time t2, the PN-code bit string {1, 1, 0, 1, 0, 1, 1, 0, 0, 1, 0, 0, 0, 1, 1} in the storage shift register 23 is one-bit out of phase with the PN-code bit string when the capacitances of a plurality of sensor devices are multiplexed by the previous drive pulse P1 at time t1. This bit string is supplied to the switches $SW_{15}$ through $SW_1$ of the row-line switch circuit 8.

At time t2, in synchronization with a predetermined period in which the drive pulse P2 is applied to the column line C1, the row lines R1, R2, R6, R9, R10, R12, R14, and R15 are multiplexed as the positive-level row line group and are connected to the inverting input terminal of the operational amplifier 121, and the row lines R3, R4, R5, R7, R8, R11, and R13 are multiplexed as the negative-level row line group and are connected to the inverting input terminal of the operational amplifier 122.

In this case, as in time t1, the timing control circuit 11 outputs, as indicated by (b) of FIG. 9 and (a) of FIG. 10, a reset signal to the differential detecting circuit 6 slightly before the rise and slightly before the fall of the drive pulse for driving the column line. The timing control circuit 11 also outputs, as indicated by (d) of FIG. 9 and (b) of FIG. 10, a sample-and-hold (S/H) signal to the sample-and-hold circuit 7 slightly before the fall of the reset signal. The state at time t2 corresponds to the state at time t1.

At time t2, the operation from time td1 to time td5 described with reference to FIG. 9 is repeated to shift the PN-code bit string by one bit, and a plurality of column lines are driven to multiplex the capacitances at the plurality of sensor devices, and the multiplexed capacitance is converted into the voltage, thereby obtaining the measured voltage.

Figures 11, 12:
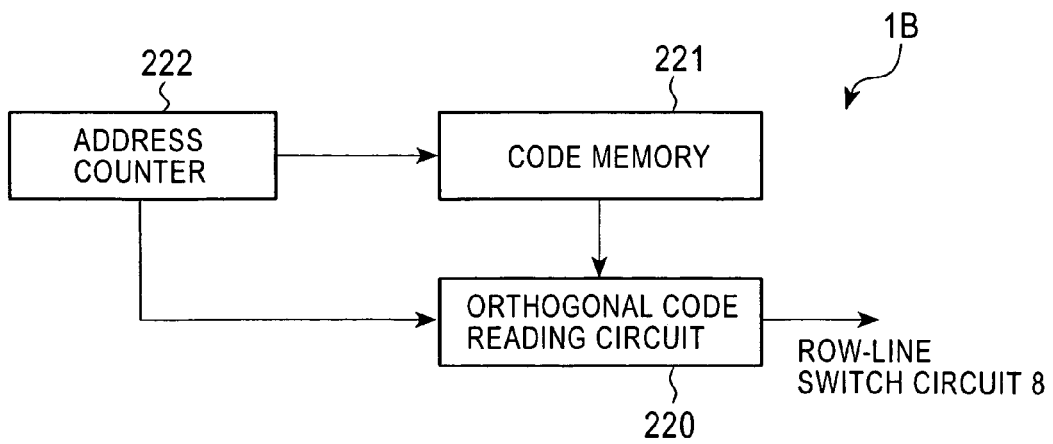
FIG. 11 is a table indicating bit data of PN-code bit strings stored in a storage shift register as a result of performing one bit shift.
FIG. 12 is a block diagram illustrating the configuration of a code generator used in a second embodiment.

The operation from td1 to td5 at time t1 and time t2 shown in FIG. 9 is repeated at each of time t3 to time t15 (the PN-code bit strings at the individual times stored in the storage shift register 23 are shown in FIG. 11, and the LSBs or MSBs indicate the order of the PN-code bit string at the individual times). That is, in each cycle, the PN-code bit string is shifted by one, a column line is driven, and the measured voltage is obtained, thereby performing fingerprint taking.

The capacitor detecting circuit 100 performs the above-described measurements every time a predetermined column line of the column line set 2 is driven by the drive pulse P so as to shift the 15-bit PN code by one bit, thereby obtaining 15 measured voltages Vd, which are out of phase with each other by one bit, in chronological order for the individual column lines. The measured voltages Vd are converted into the measured data Vd by the A/D converter 9. Thus, data strings {d1, d2, . . . , and d15}, which are measured data obtained by differentially amplifying the multiplexed voltages as the positive-level row line group and the negative-level row line group, are obtained.

As the measured data, which are out of phase with each other by one bit for the individual row lines, the following data strings are stored in the memory in the decoding computation circuit 10:

$$d1 = +Vs1 - Vs2 - Vs3 - Vs4 + Vs5 - Vs6 - Vs7 + Vs8 +$$
$$Vs9 - Vs10 + Vs11 - Vs12 + Vs13 + Vs14 + Vs15$$
$$d2 = +Vs1 + Vs2 - Vs3 - Vs4 - Vs5 + Vs6 - Vs7 - Vs8 +$$
$$Vs9 + Vs10 - Vs11 + Vs12 - Vs13 + Vs14 + Vs15$$
$$d3 = +Vs1 + Vs2 + Vs3 - Vs4 - Vs5 - Vs6 + Vs7 - Vs8 -$$
$$Vs9 + Vs10 + Vs11 - Vs12 + Vs13 - Vs14 + Vs15$$
$$d4 = +Vs1 + Vs2 + Vs3 + Vs4 - Vs5 - Vs6 - Vs7 + Vs8 -$$
$$Vs9 - Vs10 + Vs11 + Vs12 - Vs13 + Vs14 - Vs15$$
$$\vdots$$
$$d15 = -Vs1 - Vs2 - Vs3 + Vs4 - Vs5 - Vs6 + Vs7 +$$
$$Vs8 - Vs9 + Vs10 - Vs11 + Vs12 + Vs13 + Vs14 + Vs15$$

where Vs indicates the digital voltage data converted from each capacitance of the sensor device at the intersection of each of the driven column lines and the row line, and the measured data d is multiplexed capacitances of the sensor devices corresponding to the driven column line based on the PN code.

The above-described equations can be modified into the following general expression:

$$d_i = \sum_{j=1}^{N} \begin{cases} PNs(i-j+1) \times Vs(j) & (i \geq j) \\ PNs(i-j+1+N) \times Vs(j) & (i < j) \end{cases} \quad (1)$$

wherein j (1, 2, 3, and so on) designates the number of row line R, and i (1, 2, 3, and so on) represents the number of the measured data (corresponding to the phase-shift order).

In the above equation, when the PN-code bit data PNi is 1, the polarity sign PNs(i) is +1, and when PNi is 0, the polarity sign PNs(i) is −1. Accordingly, the voltage data Vsj obtained by multiplying the capacitances Csj of the sensor devices at the intersections by the polarity sign PNs(i) are added, resulting in the measured data di.

Then, the decoding computation circuit 10 determines the voltage data Vs of each sensor device from the multiplexed measured data and the PN code used for multiplexing the data according to the following equation.

$$ds_j = \sum_{i=1}^{N} \begin{cases} PNs(i-j+1) \times d(i) & (i \geq j) \\ PNs(i-j+1+N) \times d(i) & (i < j) \end{cases} \quad (2)$$

As stated above, the time-series measured data d determined by sequentially shifting the PN code by one bit can be separated into the voltage data ds corresponding to the capacitance of the sensor devices at the intersections between the driven column line and the positive-level row line group and the negative-level row line group, i.e., into voltage data Vs, by the product sum computation of the PN code and the measured data d according to equation (2).

In equation (2), it is assumed that, when the PN-code bit data PNi is 1, the polarity sign PNs(i) is +1, and when PNi is 0, the polarity sign PNs(i) is −1.

The decoding computation circuit 10 separates the measured data d into the voltage data ds by using equation (2).

More specifically, the voltage data ds of the sensor devices, i.e., the voltage data {ds1, ds2, ds3, ds4, ds5, ds6, ds7, ds8, ds9, ds10, ds11, ds12, ds13, ds14, ds15} are multiplexed by the PN code, resulting in the data string of the measured data {d1, d2, d3, d4, d5, d6, d7, d8, d9, d10, d11, d12, d13, d14, d15}.

Accordingly, for the decoding operation, the data PNi is converted into the above-described polarity sign for each measured data di by using the PN-code bit string {1 (LSB), 1, 1, 1, 0, 1, 0, 1, 1, 0, 0, 1, 0, 0, 0 (MSB)}, and then, the measured data di is multiplied with the converted polarity sign.

The order of the bit string of the PN code used for decoding corresponds to the order of the row lines (the numbers of the topmost line of the table in FIG. 11 stored in the decoding computation circuit 10). For example, the LSBs of the data at the individual times arranged in chronological order are the bit string {1 (LSB (t1)), 1, 1, 1, 0, 1, 0, 1, 1, 0, 0, 1, 0, 0, 0 (MSB (t15))) of the PN code at the initial state before the start of the measurements. Accordingly, it can be seen that the data of this PN-code bit string is the same as the data of the row line R1 at the individual times used for dividing them into the positive-level row line group and the negative-level row line group.

Similarly, the MSBs of the data at the individual times arranged in chronological order are the bit string {1 (LSB (t1)), 1, 1, 0, 1, 0, 1, 1, 0, 0, 1, 0, 0, 0, 1(MSB (t15))}, which is the PN-code bit string at the end of the cycle. Accordingly, it can be seen that the data of this PN-code bit string is the same as the data of the row line R15 at the individual times used for dividing them into the positive-level row line group and the negative-level row line group.

Thus, the voltage data ds1 corresponding to the intersections with the row line R1 is determined by using the PN-code bit string {1 (LSB), 1, 1, 1, 0, 1, 0, 1, 1, 0, 0, 1, 0, 0, 0 (MSB)} in the following manner. The polarity sign corresponding to bit data PNi of this bit string is multiplied with the measured data di at each time, and the resulting values are added over one cycle.

More specifically, the row line R1 is driven at time t1 according to the LSB of the PN-code bit string, and is driven at time t2 according to the second bit of the PN-code bit string, and finally, it is driven at time t15 according to the MSB of the bit string (see the table shown in FIG. 11). Accordingly, also in the product sum computation, the polarity signs corresponding to the PN code data at the individual times t1 through t15 (one cycle) are multiplied with the measured data at the corresponding times. Similarly, for the voltage data ds2 corresponding to the intersections with the row line R2, the PN-code bit string is shifted by one bit, resulting in {0 (LSB (time t1)), 1, 1, 1, 1, 0, 1, 0, 1, 1, 0, 0, 1, 0, 0 (MSB (time t15))} (corresponding to the second column in FIG. 11), and the polarity sign corresponding to the data PNi of each bit of this bit string is multiplied with the measured data di, and the resulting values are added over one cycle.

The above-described processing corresponds to the product sum computation for PN code, and the voltage data dsj corresponding to each intersection can be determined by the product sum computation of the PN-code bit strings shifted by a predetermined number of bits. In this case, in the product sum computation during decoding, the initial PN code is used for the row line R1, and thereafter, the PN codes shifted one by one are used for the subsequent numbers of row lines.

That is, in the product sum computation during decoding, for the data measured at each time, the measured data at the intersections with the row line number to be determined is multiplied with the polarity sign corresponding to the bit data of the same bit number (order) as the row line number of the bit string of the PN code used at the above-described time, and the resulting data are added. In other words, the polarity signs of the same data as those of the bit data of the PN code used for dividing the corresponding row lines at each time are used.

In this embodiment, when the PN-code bit string corresponding to the 15 column lines is {1, 1, 1, 1, 0, 1, 0, 1, 1, 0, 0, 1, 0, 0, 0}, the decoding computation circuit 10 performs the following computation based on equation (2).

$$ds1 = +d1 + d2 + d3 + d4 - d5 + d6 - d7 +$$
$$d8 + d9 - d10 - d11 + d12 - d13 - d14 - d15$$

-continued
$$ds2 = -d1 + d2 + d3 + d4 + d5 - d6 + d7 - d8 +$$
$$d9 + d10 - d11 - d12 + d13 - d14 - d15$$
$$ds3 = -d1 - d2 + d3 + d4 + d5 + d6 - d7 + d8 -$$
$$d9 + d10 + d11 - d12 - d13 + d14 - d15$$
$$ds4 = -d1 - d2 - d3 + d4 + d5 + d6 + d7 - d8 +$$
$$d9 - d10 + d11 + d12 - d13 - d14 + d15$$
$$\vdots$$
$$ds15 = +d1 + d2 + d3 - d4 + d5 - d6 +$$
$$d7 + d8 - d9 - d10 + d11 - d12 - d13 - d14 + d15$$

Then, the decoding computation circuit 10 separates (decodes) the voltage data dsj corresponding to the capacitance of each sensor device from the data string of the measured data di.

In this manner, as in the detection of the capacitances at the intersections between the column line C1 and the row line set 3, the capacitances at the intersections between each of the column lines C2 through C15 and the row line set 3 are detected.

As described above, in the first embodiment, the row-line switch circuit 8 divides the row lines of the row line set 3 into the positive-level row line group and the negative-level row line group based on the PN code, and outputs the synthesized measured voltage, and in the subsequent timing, the phase of the PN code is shifted. This operation is repeated. Meanwhile, the time-series data obtained by the detecting side is subjected to product sum computation with the PN code. Accordingly, the influences of the capacitances at the intersections with the other column lines can be substantially averaged, and also, only the information concerning electric charge charged and discharged in and from the sensor device (capacitor sensor) at the intersection between the target row line and column line can be extracted.

In the first embodiment, M-series PN code is used. Although there are other types of PN codes, M-series PN code has high autocorrelation. Thus, the influences of M-series PN code on the adjacent row lines when decoding the detected data become uniform, thereby most effectively reducing crosstalk between the row lines.

Figure 13A:
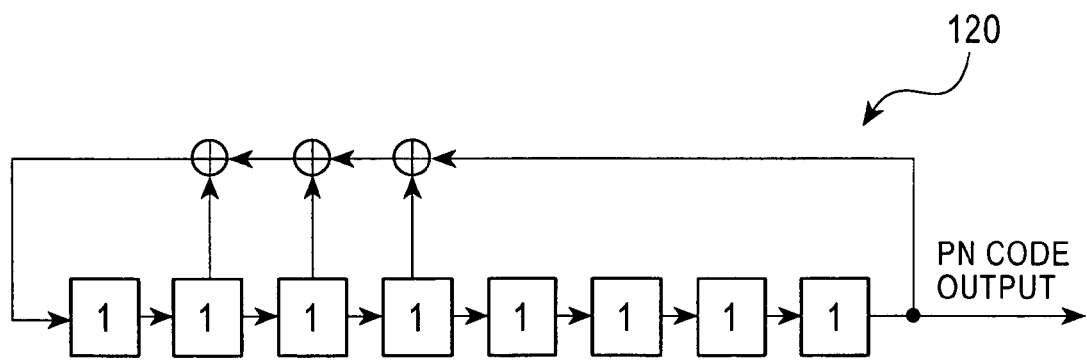
FIG. 13A illustrates the configuration of a code generating circuit when column lines are 255.
Figure 13B:
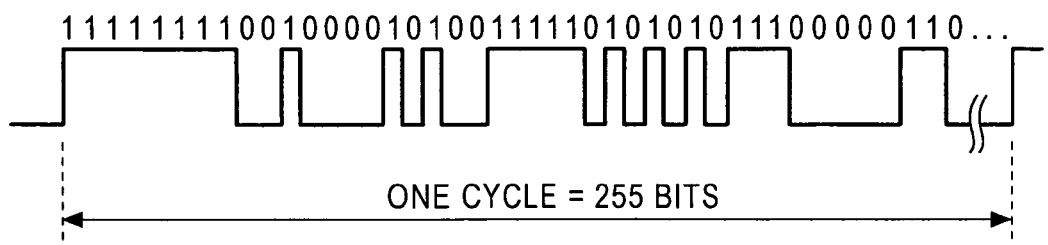
FIG. 13B illustrates an example of a data string of the code generated by the code generating circuit shown in FIG. 13A.

The length of the M-series PN code is associated with the number of row lines. For example, if the number of row lines is 255, a LFSR 120, which generates M-series PN code, becomes 8 stages, as shown in FIG. 13A, and the length of one cycle is 255 bits (although this is represented by the "chip" in CDMA communication, it is referred to as the "bit").

Second Embodiment

A capacitance detecting circuit constructed in accordance with a second embodiment of the present invention is described below with reference to FIG. 1. Elements similar to those of the first embodiment are designated with like reference numerals, and an explanation thereof is thus omitted.

The capacitance detecting circuit of the second embodiment differs from that of the first embodiment in that the code generator 1 for generating PN code is substituted with a code generator 1B for generating orthogonal code.

The code generator 1B generates orthogonal code used for generating a control signal for selecting the row lines of the row line set 3 of the sensor unit 4. As the orthogonal code, orthogonal code having high orthogonality, for example, Walsh code, is used.

The code generator 1B outputs a control signal indicating the order of the bit string of this orthogonal code to the row-line switch circuit 8 for switching the row lines of the row line set 3 into the two row line groups based on the orthogonal code.

Based on this control signal, the row-line switch circuit 8 assigns the row lines to the positive-level row line group when the bit data of the orthogonal-code bit string is 1, and allocates the row lines to the negative-level row line group when the orthogonal-code bit data is 0. That is, the row-line switch circuit 8 synthesizes (multiplexes) the currents flowing in the capacitors in the selected row lines of the sensor unit 4. The operations of the timing control circuit 11, the code generator 1B, the column line driver 5, the differential detecting circuit 6, the sample-and-hold circuit 7, and the row-line switch circuit 8 are similar to those of the first embodiment, and an explanation thereof is thus omitted.

An example of the operation of the capacitance detecting circuit 100 constructed in accordance with the second embodiment of the present invention is described below with reference to FIG. 1. The operation of the second embodiment is similar to that of the first embodiment, except that orthogonal code is used for multiplexing measured data instead of the PN code in the first embodiment. For the sake of simplicity, only the operation different from that of the first embodiment is discussed, assuming that 15-bit-length orthogonal code generated by an orthogonal code reading circuit 220, which is described below, is used.

A signal indicating the start of the detection of the capacitance, that is, a signal indicating the start of fingerprint taking in the fingerprint sensor (sensor unit 4), is input into the decoding computation circuit 10.

In response to this signal, the decoding computation circuit 10 outputs a start signal instructing the timing control circuit 11 to start detection to the timing control circuit 11. In response to the start signal, the timing control circuit 11 outputs a clock signal and a reset signal to the code generator 1B.

In response to the reset signal, the code generator 1B initializes the registers, i.e., an address counter 222 and the orthogonal code reading circuit 220 (FIG. 12), via the orthogonal code reading circuit 220, and sequentially reads and outputs the orthogonal codes from a code memory 221 in synchronization with the clock.

In the code generator 1B, the generated orthogonal codes are stored in the built-in code memory 221, and every time the clock is input, an orthogonal data string is output to the row-line switch circuit 8.

Walsh code, which is the typical orthogonal code, is generated in the order shown in FIG. 14. As the basic structure, a 2×2-basic unit is formed in such a manner that the bits at the top right, top left, and bottom left are the same, and the bits at the bottom right are inverted from the bits thereof.

Then, four of the 2×2-basic units are combined to form a 4×4-bit matrix. In this case, as in the 2×2-basic unit, the bits at the top right, top left, and bottom left are the same, and the bits at the bottom right are inverted. Similarly, an 8×8-bit matrix, a 16×16-bit matrix, and so on, are formed. In this manner, the number of bits in the matrix can be expanded into the number of bits (corresponding to the number of columns) in the bit string and the number of codes (corresponding to the number of rows).

In the second embodiment, the first row and the first column in which all the logical bit data are 0 are excluded from the code since the first row and column lines cannot be detected and measured data cannot be multiplexed. That is, in the example of FIG. 14, a 15×15-bit matrix is set to be the orthogonal code.

As discussed above, Walsh code can be generated even for long-length code, and the Walsh code generated as described above is used for multiplexing the capacitances in the following manner.

In this embodiment, the column line set 2 is formed of, for example, 15 row lines C1 through C15, and the 15×15-bit matrix orthogonal code is used for multiplexing the capacitances.

In the code memory (code memory 221 shown in FIG. 12) in the code generator 1B, the orthogonal data represented by the above-described 15×15-bit matrix is stored in the data format indicated by the table shown in FIG. 15. Each row line corresponds to addresses t1 through t15 and the corresponding data are sequentially stored.

The Walsh code at address t1 is {1 (LSB) 0, 1, 0, 1, 0, 1, 0, 1, 0, 1, 0, 1, 0, 1 (MSB)}, and the Walsh code at address t15 is {1 (LSB) 1, 0, 1, 0, 0, 1, 1, 0, 0, 1, 0, 1, 1, 0 (MSB)}.

In response to a start signal, the timing control circuit 11 outputs a measurement start signal to the orthogonal code generator 1B.

In response to the measurement start signal, the orthogonal code reading circuit 220 shown in FIG. 12 resets the address counter 222 and the storage register 23, and sets the count number of the address counter 222 to be 0.

After initializing the orthogonal code generator 1B, every time a clock is input from the timing control circuit 11 when measuring the capacitances at the intersections, the orthogonal code reading circuit 220 outputs a count signal to the address counter 222.

The address counter 222 then counts the input count signal, and outputs the addresses t1, t2, . . . , and t15 corresponding to the count number to the code memory 221.

The code memory 221 then outputs the Walsh code data (bit string in the row line) corresponding to the input addresses t1, t2, . . . , and t15 to the orthogonal code reading circuit 220.

In response to a shift clock from the timing control circuit 11, the orthogonal code reading circuit 220 serially outputs the orthogonal code as the control signal in the order from the LSB to the MSB of the Walsh-code bit string to the row-line switch circuit 8.

Then, the bits of the data string {1 (LSB) 0, 1, 0, 1, 0, 1, 0, 1, 0, 1, 0, 1, 0, 1 (MSB)} are input into the registers $23_1$, $23_2$, $23_3$, $23_4$, $23_5$, $23_6$, $23_7$, $23_8$, $23_9$, $23_{10}$, $23_{11}$, $23_{12}$, $23_{13}$, $23_{14}$, and $23_{15}$, respectively.

The row-line switch circuit 8 then controls the ON/OFF states of the corresponding switches based on the bit data of the bit string of the input orthogonal code, thereby dividing the row lines into the positive-level row line group and the negative-level row line group.

In a manner similar to the capacitance detection processing discussed in the first embodiment, at each of the times t1 to t15, the processing from td1 to td5 shown in FIG. 10 is repeated (the order of orthogonal-code bit strings stored in the storage register 23 at the individual times are indicated in the table in FIG. 15). Then, the orthogonal code is read from the code memory 221, the column line is driven, and the measured voltage is obtained; such an operation is repeated over one cycle of the memory addresses t1 to t15, thereby obtaining a fingerprint.

Then, in the capacitor detecting circuit 100, in response to the drive pulse P at each time, the code generator 1B sequentially reads from the code memory 221 15-bit orthogonal code obtained as a result of the above-described measurement processing. The row-line switch circuit 8 then divides the row lines into the positive-level row line group and the negative-level row line group. The predetermined column line of the column line set 2 is then driven at each time.

Accordingly, in the capacitor detecting circuit 100, the 15 measured voltages Vd at the addresses t1 to t15 corresponding to the individual times are obtained for each row line in chronological order. The measured voltages Vd are converted into the measured data d by the A/D converter 9, resulting in the data string {d1, d2, . . . , d15} of the measured data multiplexed by the orthogonal code.

As the measured data having 15 measured voltages (measured by using the orthogonal codes shown in FIG. 15), the following data strings are stored in the memory in the decoding computation circuit 10:

$$d1 = +Vs1 - Vs2 + Vs3 - Vs4 + Vs5 - Vs6 + Vs7 - Vs8 +$$
$$Vs9 - Vs10 + Vs11 - Vs12 + Vs13 - Vs14 + Vs15$$
$$d2 = -Vs1 + Vs2 + Vs3 - Vs4 - Vs5 + Vs6 + Vs7 - Vs8 -$$
$$Vs9 + Vs10 + Vs11 - Vs12 - Vs13 + Vs14 + Vs15$$
$$d3 = +Vs1 + Vs2 - Vs3 - Vs4 + Vs5 + Vs6 - Vs7 - Vs8 +$$
$$Vs9 + Vs10 - Vs11 - Vs12 + Vs13 + Vs14 - Vs15$$
$$d4 = -Vs1 - Vs2 - Vs3 + Vs4 + Vs5 + Vs6 + Vs7 - Vs8 -$$
$$Vs9 - Vs10 - Vs11 + Vs12 + Vs13 + Vs14 - Vs15$$
$$\vdots$$
$$d15 = +Vs1 + Vs2 - Vs3 + Vs4 - Vs5 - Vs6 + Vs7 +$$
$$Vs8 - Vs9 - Vs10 + Vs11 - Vs12 + Vs13 + Vs14 - Vs15$$

where Vs indicates the digital voltage data converted from each capacitance of the sensor device at the intersection of each of the driven column lines and the corresponding row line, and the measured data d is multiplexed capacitances of the sensor devices corresponding to the driven column line based on the orthogonal code.

The above-described equations can be modified into the following general expression:

$$d_i = \sum_{j=1}^{N} CDs(i, j) \times Vs(j) \quad (3)$$

wherein j (1, 2, 3, . . . , N) designates the number of row line R, and i (1, 2, 3, . . . , N) represents the number of the measured data (corresponding to the order of the address ti). That is, CD(i,j) in equation (3) indicates the polarity sign of the j-th element of the i-th address at time ti.

In the above equation, when the orthogonal-code bit data CD(i,j) is 1, the polarity sign CDs(i,j) is +1, and when CD(i,j) is 0, the polarity sign CDs(i,j) is −1. About a half (8) of the row lines are set to be the positive-level row line group and about the other half (7) of the row lines are set to be the negative-level row line group. The voltage data Vsj obtained by multiplying the capacitances Csj of the sensor devices at the intersections by the polarity sign CDs(i,j) are added, resulting in the measured data di.

Then, the decoding computation circuit 10 determines the voltage data Vs of each sensor device from the multiplexed measured data and the orthogonal code used for multiplexing the data according to equation (4).

$$ds_j = \sum_{i=1}^{N} CDs(i, j) \times d(i) \quad (4)$$

As stated above, the time-series measured data d determined by sequentially reading the orthogonal code from the code memory 221 can be separated into the voltage data ds corresponding to the capacitances of the sensor devices at the intersections between the driven column line and the positive-level row line group and the negative-level row line group, i.e., into voltage data Vs, by the product sum computation of the orthogonal code and the measured data d according to equation (4).

In equation (4), it is assumed that, when the orthogonal-code bit data CD(i,j) is 1, the polarity sign CDs(i,j) is +1, and when CD(i,j) is 0, the polarity sign CDs(i,j) is −1.

The decoding computation circuit 10 separates the measured data d into the voltage data ds by using equation (4).

More specifically, the voltage data ds of the sensor devices, i.e., the voltage data {ds1, ds2, ds3, ds4, ds5, ds6, ds7, ds8, ds9, ds10, ds11, ds12, ds13, ds14, ds15} are multiplexed by the orthogonal code for each row line, resulting in the data string of the measured data {d1, d2, d3, d4, d5, d6, d7, d8, d9, d10, d11, d12, d13, d14, d15}.

Accordingly, for the decoding operation, each measured data di is multiplied with the polarity sign CDs(i,j) corresponding to the data CD(i,j) of each bit of the orthogonal-code bit string {1 (LSB), 0, 1, 0, 1, 0, 1, 0, 1, 0, 1, 0, 1, 0, 1 (MSB)}.

The order of the bit string corresponds to the order of the row lines; for example, the LSBs correspond to the row line R1, and the MSBs correspond to the row line R15.

Thus, the voltage data ds1 corresponding to the intersections with the row line R1 is determined by using the LSBs of the orthogonal-code bit string at addresses t1 to t15 {1(t1), 0(t2), 1(t3), 0(t4), 1(t5), 0(t6), 1(t7), 0(t8), 1(t9), 0(t10), 1(t11), 0(t12), 1(t13), 0(t14), 1(t15)} in the following manner. The polarity sign CDs(i,j) corresponding to bit data CD(i,j) of this bit string is multiplied with each measured data di, and the resulting values are added over one cycle.

More specifically, the voltage data ds1 at the intersections with the row line R1 has been obtained in the following manner. The row line R1 is classified into the positive/negative-level row line group by the bit data of the LSB (first bit) of the orthogonal code at address t1 at time t1, and is classified into the positive/negative-level row line group by the LSB of the orthogonal code at address t2 at time t2, and similarly, it is classified into the positive/negative-level row line group by the LSB of the orthogonal code at address t15 at time t15. Accordingly, also in the product sum computation, each measured data di is multiplied with the polarity sign corresponding to the bit data of the used orthogonal code and the resulting values are added.

Similarly, the voltage data ds2 at the intersections with the row line R2 has been obtained in the following manner. The row line R2 is classified into the positive/negative-level row line group by the bit data of the second bit of the orthogonal code at address t1 at time t1, and is classified into the positive/negative-level row line group by the second bit of the orthogonal code at address t2 at time t2, and similarly, it is classified into the positive/negative-level row line group by the second bit of the orthogonal code at address t15 at time t15. Accordingly, also in product sum computation, each measured data di is multiplied with the polarity sign corresponding to the bit data of the used orthogonal code and the resulting values are added.

That is, the voltage data ds2 corresponding to the intersections with the row line R2 is determined by using the second bits of the orthogonal-code bit string at addresses t1 to t15 {0(t1), 1(t2), 1(t3), 0(t4), 0(t5), 1(t6), 1(t7), 0(t8), 0(t9), 1(t10), 1(t11), 0(t12), 0(t13), 1(t14), 1(t15)} in the following manner. The polarity sign CDs(i,j) corresponding to bit data CD(i,j) of this bit string is multiplied with each measured data di, and the resulting values are added over one cycle.

As discussed above, the voltage corresponding to the capacitance at each intersection is obtained as follows. Each measured data di is multiplied with the polarity sign CDs(i,j) corresponding to the data CD(i,j) of the orthogonal-code bit string used for dividing the row line set 3 into the positive-level row line group and the negative-level row line group when the drive pulse P is applied at each of the times t1 to t15, and the resulting values are added over one cycle. This processing corresponds to product sum computation using orthogonal code. The voltage data dsj corresponding to each intersection is determined by the product sum computation of the measured data di and the polarity signs corresponding to the orthogonal-code bit string stored in the code memory 221.

That is, in the product sum computation during decoding, for the data measured at each time, the measured data at the intersections with the row line number to be determined is multiplied with the polarity sign corresponding to the bit data of the same bit number (order) as the row line number of the orthogonal-code bit string used at the above-described time, and the resulting data are added. In other words, the polarity signs of the same data as those of the bit data of the orthogonal code used for dividing the corresponding row line into the positive-level row line group or the negative-level row line group at each time are used.

In the orthogonal code stored in the code memory 221 corresponding to the 15 column lines, the decoding computation circuit 10 performs the following computation based on equation (4) according to the orders of the orthogonal-code bit strings at the addresses t1 to t15.

$$ds1 = +d1 - d2 + d3 - d4 + d5 - d6 + d7 -$$
$$d8 + d9 - d10 + d11 - d12 + d13 - d14 + d15$$
$$ds2 = -d1 + d2 + d3 - d4 - d5 + d6 + d7 - d8 -$$
$$d9 + d10 - d11 - d12 - d13 + d14 + d15$$
$$ds3 = +d1 + d2 - d3 - d4 + d5 + d6 - d7 - d8 +$$
$$d9 + d10 - d11 - d12 + d13 + d14 - d15$$
$$ds4 = -d1 - d2 - d3 + d4 + d5 + d6 + d7 - d8 -$$
$$d9 - d10 - d11 + d12 + d13 + d14 + d15$$
$$\vdots$$
$$ds15 = +d1 + d2 - d3 + d4 - d5 - d6 +$$
$$d7 + d8 - d9 - d10 + d11 - d12 + d13 + d14 - d15$$

Then, the decoding computation circuit 10 separates (decodes) the voltage data dsj corresponding to the capacitance of each sensor device from the data string of the measured data di.

As described above, in the second embodiment, the row-line switch circuit 8 divides the row lines of the row line set 3 into the positive-level row line group and the negative-level row line group based on the orthogonal code, and outputs the synthesized measured voltage, and in the subsequent timing, the orthogonal code at the address at the corresponding time is read from the code memory 221, and the above-described measurements are performed. This operation is repeated. Meanwhile, the time-series data obtained by the detecting side is subjected to product sum computation with the orthogonal code. Accordingly, the influences of the capacitances at the intersections with the other column lines can be substantially averaged, and also, only the information concerning electric charge charged and discharged in and from the sensor device (capacitor sensor) at the intersection with the target column line can be extracted.

Third Embodiment

A capacitance detecting circuit constructed in accordance with a third embodiment of the present invention is described below with reference to FIG. 16. Elements corresponding to those of the first and second embodiments are designated with like reference numerals, and an explanation thereof is thus omitted.

The third embodiment differs from the first and second embodiments in that the row lines of the row line set 3 are divided into a plurality of row line groups (for example, M row line groups), and multiplexing of the row lines by using PN code or orthogonal code is performed in each row line group. That is, in the third embodiment, the row line groups perform multiplexing of the row lines at the same time.

In other words, in the first and second embodiments, multiplexing by using the PN code or orthogonal code is performed on the overall row lines, while in the third embodiment, measured voltages are multiplexed by using the PN code or orthogonal code in each row line group.

Figure 16:
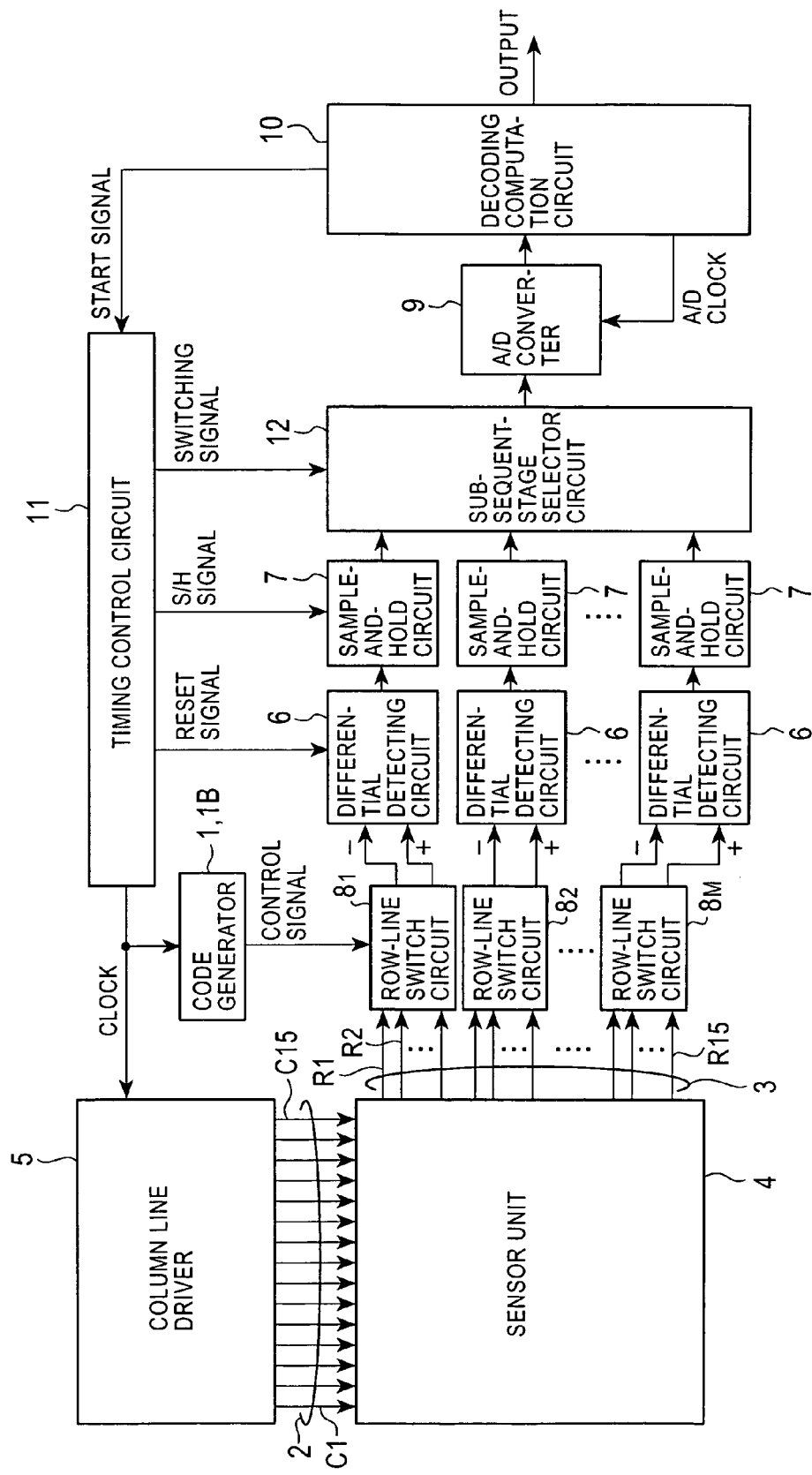
FIG. 16 is a block diagram illustrating the configuration of a fingerprint sensor using a capacitance detecting circuit constructed in accordance with a third embodiment of the present invention.

In the capacitance detecting circuit 100 in the third embodiment, if the row line set 3 is divided into M row line groups, as shown in FIG. 16, row-line switch circuits $8_1$, $8_2$, ..., $8_M$ are connected to the row line groups $3_1$, $3_2$, ..., $3_M$, respectively. The configuration of each of the row-line switch circuits $8_1$, $8_2$, ..., $8_M$ is similar to the configuration of the row-line switch circuit 8 shown in FIGS. 5A through 5C.

The same PN code (or orthogonal code) is supplied to all the row-line switch circuits $8_1$, $8_2$, ..., $8_M$ from the code generator 1 (or 1B), and a differential detecting circuit 6 is provided for each of the row-line switch circuits $8_1$, $8_2$, ..., $8_M$.

A sample-and-hold circuit 7 is provided for each of the differential detecting circuits 6, and as in the first and second embodiments, the multiplexed measured voltage is held in the corresponding sample-and-hold circuit 7 in synchronization with the S/H signal.

With this configuration, as in the first and second embodiments, all the row lines in the row line set 3 are measured in parallel with each other.

Then, the measured voltages held in the sample-and-hold circuits 7 are output to a subsequent-stage selector circuit 12, and output signals from the sample-and-hold circuits 7 selected in response to a switch signal from the timing control circuit 11 are sequentially output to the A/D converter 9 from the subsequent-stage selector circuit 12.

In response to the A/D clock input from the decoding computation circuit 10, the A/D converter 9 samples the measured voltages output from the sample-and-hold circuits 7 in chronological order, converts the voltages into digital data, and then outputs it to the decoding computation circuit 10.

Since the row lines of the row line set 3 are divided into a plurality of row line groups, the number of code bits required for multiplexing can be reduced, thereby decreasing the computation time required for decoding over the first and second embodiments.

The operation for measuring capacitances in each row line group is similar to that of the first and second embodiments, and a detailed explanation thereof is thus omitted.

Fourth Embodiment

A capacitance detecting circuit 100 constructed in accordance with a fourth embodiment of the present invention is described below with reference to FIG. 17. Elements similar to those of the first, second, and third embodiments are designated with like reference numerals, and an explanation thereof is thus omitted.

The fourth embodiment differs from the third embodiment in that the row line set 3 is divided into a plurality of row line groups, and the row line groups are sequentially selected one by one to perform measurements, namely, while a selected row line group performs measurements, the other (unselected) row line groups do not perform measurements.

That is, in the third embodiment, all the row line groups simultaneously perform the multiplexing of measured voltages by using the PN code or orthogonal code, while, in the fourth embodiment, the row line groups sequentially perform the multiplexing of measured voltages by using the PN code or orthogonal code.

Figure 17:
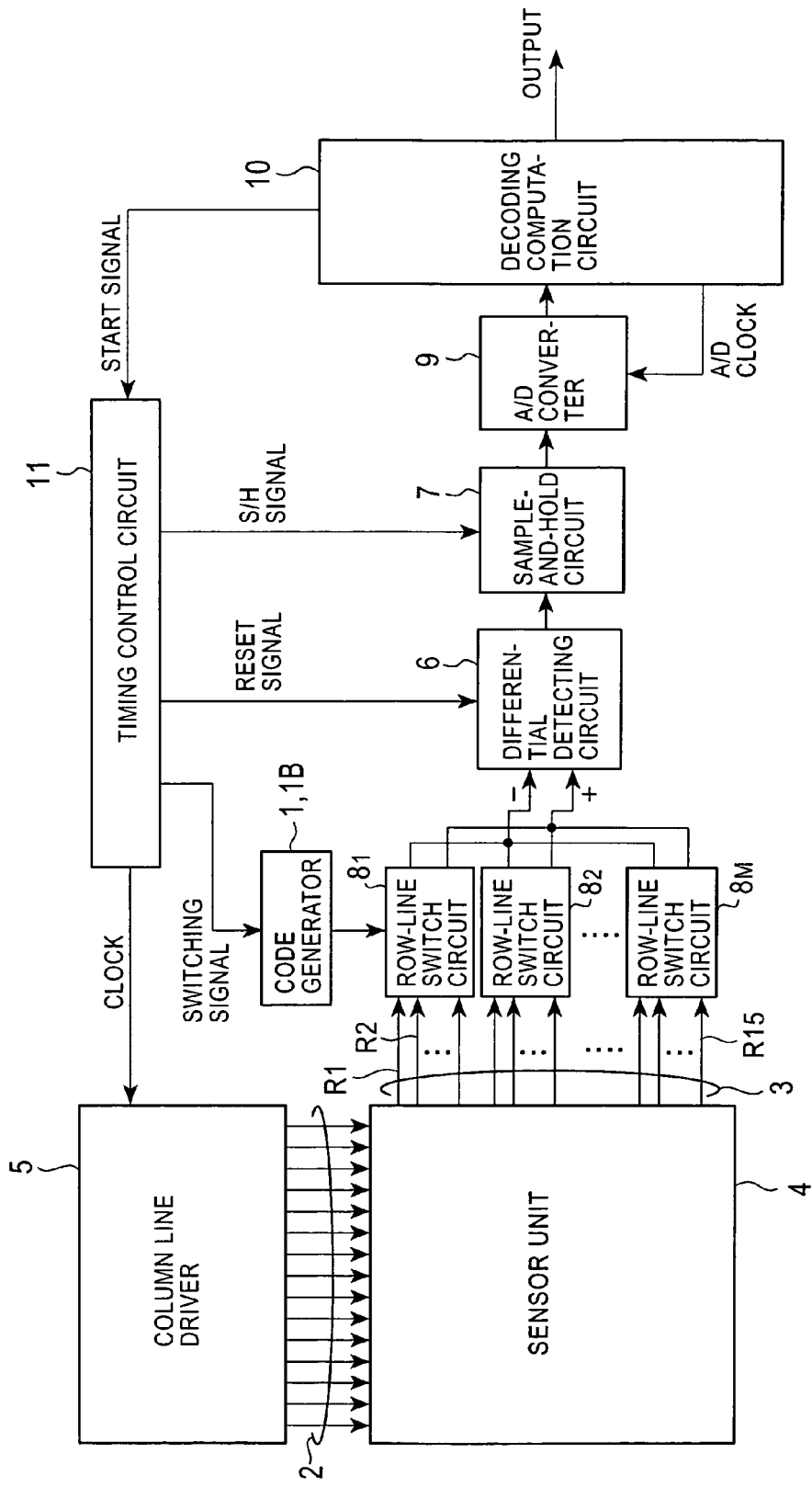
FIG. 17 is a block diagram illustrating the configuration of a fingerprint sensor using a capacitance detecting circuit constructed in accordance with a fourth embodiment of the present invention.

In the capacitance detecting circuit 100 in the fourth embodiment, if the row line set 3 is divided into M row line groups, as shown in FIG. 17, row-line switch circuits $8_1, 8_2, \ldots, 8_M$ are connected to the row line groups $3_1, 3_2, \ldots, 3_M$, respectively. The configuration of each of the row-line switch circuits $8_1, 8_2, \ldots, 8_M$ is similar to the configuration of the row-line switch circuit 8 shown in FIGS. 5A through 5C.

The timing control circuit 11 sequentially selects the row-line switch circuits $8_1, 8_2, \ldots, 8_M$ one by one at predetermined intervals, and activates (enables) the selected row line groups.

The same PN code (or orthogonal code) is supplied to all the row-line switch circuits $8_1, 8_2, \ldots, 8_M$ from the code generator 1 (or 1B).

In contrast, the unselected row-line switch circuits are in the non-active state (disable state), and the outputs from such row-line switch circuits to the differential detecting circuit 6 are in the floating state.

Accordingly, the output of the selected row-line switch circuit, i.e., the multiplexed output of the row lines of the row line group corresponding to the selected row-line switch circuit divided into the positive/negative row line groups by using the PN code or orthogonal code is input into the differential detecting circuit 6.

The row lines selected as the positive-level row line group are connected to the inverting input terminal of the operational amplifier 121, while the row lines selected as the negative-level row line group are connected to the inverting input terminal of the operational amplifier 122.

Then, the timing control circuit 11 sequentially selects the target row-line switches, i.e., the corresponding row line groups, and as in the first and second embodiments, the row-line switch circuit 8 then multiplexes the row lines in each of the selected row line groups by using the PN code or orthogonal code, thereby measuring the capacitances at the intersections at each of the row lines.

The column line driver 5 sequentially outputs the drive pulse to the column lines of the column line set 2 in synchronization with the clock from the timing control circuit 11.

After finishing the measurements of one row line group in accordance with the selection of the row-line switch circuit 8, the timing control circuit 11 selects another row-line switch circuit 8, and similarly controls the output of the drive pulse to the column line driver 5.

The number of row lines in each row line group is the same as the number of bits of the bit string of the PN code or orthogonal code generated by the code generator 1 (or 1B).

In the third and fourth embodiments, if the number of bits of the PN code or the orthogonal code is 15, the number of row lines in each of the row line groups $3_1$ through $3_M$ is also 15.

In the third and fourth embodiments, adjacent, consecutive row lines are combined into a group, and if the number of bits of the PN code or orthogonal code is 15 (N=15), 15 row lines are combined into one row line group, resulting in the 17 row line groups (M=17). Accordingly, 255 row lines can be controlled.

In the fourth embodiment, the selected row line group corresponding to the selected row-line switch circuit 8 by the timing control circuit 11 is maintained during one cycle of the PN code or orthogonal code. That is, the row line group is switched in every cycle of PN code or orthogonal code.

That is, when the measurements of the capacitances at the intersections between the row lines and the column lines are finished over one cycle in a row line group, another row line group is selected. The row line groups may be selected in the ascending order from the row line groups $3_1$ to $3_M$, or the row line groups may be selected randomly.

The operation for measuring the capacitances in each row line group is similar to that of the first, second, or third embodiment, and a detailed explanation thereof is thus omitted.

Fifth Embodiment

To further develop the third or fourth embodiment, in a fifth embodiment, in the capacitance measurement method for measuring capacitances for each row line group by dividing the row line set 3 into a plurality of row line groups, the measurement precision of the capacitance detecting circuit is improved. The configuration of the fifth embodiment can be used in the first or second embodiment to improve the measurement precision.

In the first through fourth embodiments, information concerning basic DC components disappears due to the complementary control operation for driving the row lines, and the capacitances at the intersections between a row line group multiplexed by the PN code or orthogonal code and a driven column line are not uniform on the overall surface of the sensor unit 4. This generates offset components in the measured voltages when being decoded.

The offset components vary depending on the row line group, and thus, the offset levels in the row line groups are not stabilized. As a result, in a two-dimensional fingerprint image obtained by the measured data of the individual row lines, the shade of the image may become non-uniform depending on the row line groups due to the different offset levels.

Information concerning DC components also disappears due to the capacitances in the row-line switches and the row lines. Since the capacitance loads in the row lines are not uniform, the shade of the resulting image becomes non-uniform depending on the row line, which is visually noticeable.

Accordingly, in the capacitance detecting circuit of the fifth embodiment, to suppress the non-uniform shade of a resulting image, the number of row lines in each row line group is differentiated from the number of bits of a bit string of the PN code or orthogonal code. That is, the number of row lines in a row line group is set to be smaller than the number of bits of the PN code or orthogonal code by at least one bit. In other words, if this configuration is used in the first or second embodiment, the number of row lines in the row line set 3 is set to be smaller than the number of bits of the PN code or orthogonal code by at least one line.

For example, for the 15-bit PN code or orthogonal code, one bit is set to be unused (not connected), and 14 row lines are connected to the 15-bit PN code or orthogonal code.

Accordingly, in the bit string of the PN code or orthogonal code, one bit is associated with an imaginary row line, and this imaginary row line is not activated, and can be used as a reference value of the constant capacitance.

In the decoding computation by the decoding computation circuit 10 shown in FIG. 18, the voltage data ds1 through ds14 indicate the outputs corresponding to the actual capacitances at the corresponding intersections, while the voltage data ds15 is output as a reference value (no signal) since the imaginary row line is not actually connected.

Then, the decoding computation circuit 10 performs offset computation for associating the voltage data ds15 with the predetermined reference value dref in performing the measurements for each row line group. For example, the decoding computation circuit 10 performs the following computation:

$$Ofs = ds15 - dref$$

$$dsaj = dsj - Ofs (1 \leq j \leq 14)$$

where the reference value dref is set as the reference for all the row line groups and the column lines, and the offset value Ofs is an offset amount used for correcting the voltage data for each row line group for each column line.

After determining the offset value Ofs for each row line group, the offset value Ofs is subtracted from the voltage data dsj ($1 \leq j \leq 14$) corresponding to the other row lines in the same row line group, thereby obtaining the corrected voltage data corresponding to the reference value dref in all the row line groups. As a result, a uniform shade of a two-dimensional image can be obtained.

Figure 1:
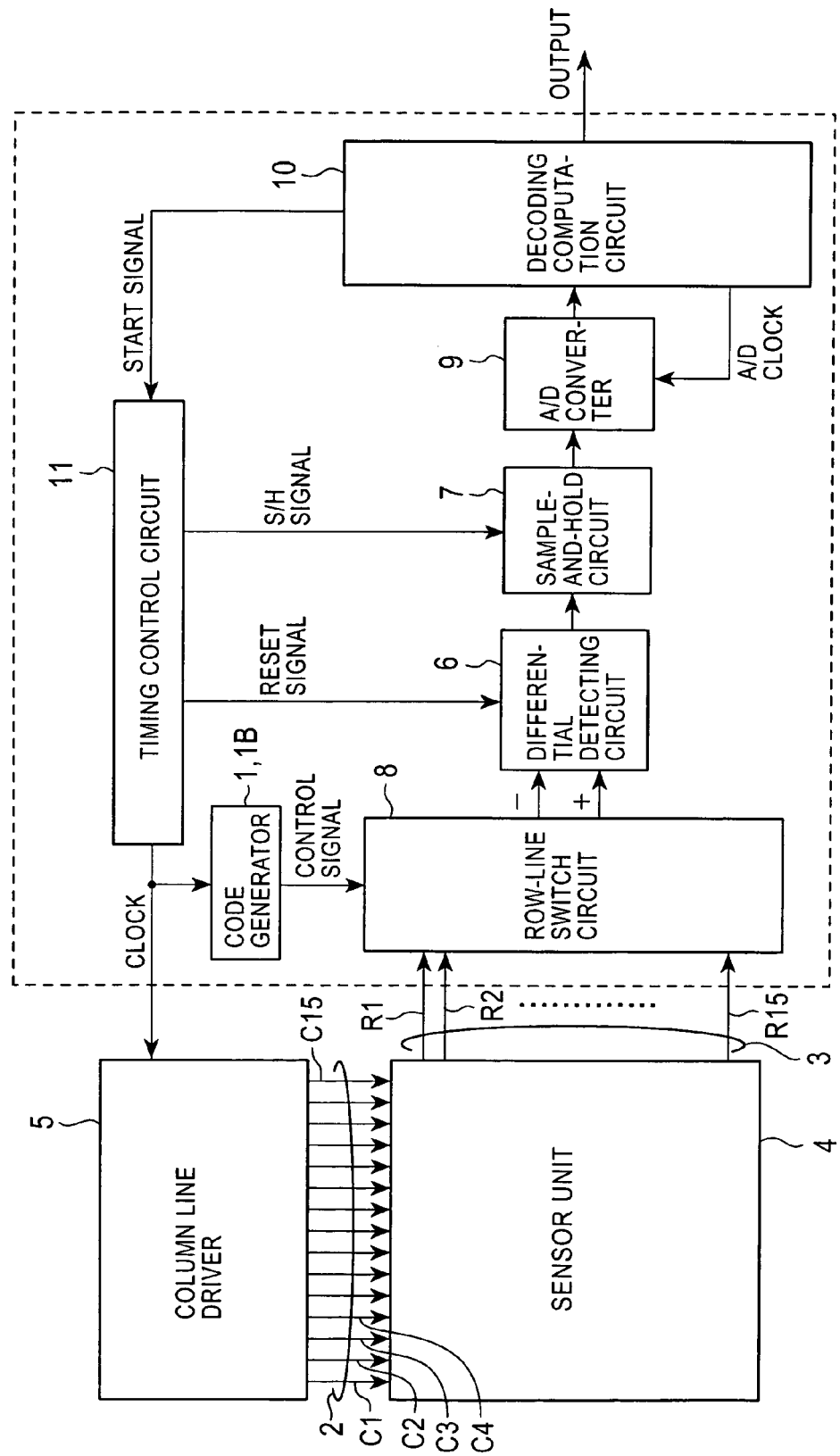
FIG. 1 is a block diagram illustrating the configuration of a fingerprint sensor using a capacitance detecting circuit constructed in accordance with a first or second embodiment of the present invention.

In the first, second, and third embodiments, a program for implementing the functions of the decoding computation circuit 10 shown in FIG. 1, 17, or 18 may be recorded on a computer-readable recording medium, and the program is read into a computer system and is executed, thereby performing computing for decoding the voltage data dsj corresponding to the capacitances of the individual sensor devices from the multiplexed measured data di. The "computer system" includes an operating system (OS), hardware, such as peripheral devices, and a WWW system provided with a homepage providing environment (or display environment). The "computer-readable recording medium" includes portable media, such as flexible disks, magneto-optical disks, read only memory (ROM), and compact disc read only memory (CD-ROM), and storage devices, such as a hard disk contained in the computer system. The computer-readable recording medium also includes storage devices for temporarily storing programs, such as volatile memory (RAM) contained in the computer system, which serves as a server or a client when the program is sent via a communication line, such as a network, for example, the Internet, or a telephone line.

The above-described program may be transmitted to another computer system via a transmission medium or transmission waves in the transmission medium from the computer system storing the program in, for example, a storage device. The "transmission medium" for transmitting the program is a medium having a function of transmitting information, such as a communication line, such as a network (communication network), for example, the Internet, or a telephone line. The program may implement only part of the above-described functions, or may implement the functions in combination with another program stored in the computer system, i.e., the program may be a so-called "difference file (difference program).

What is claimed is:

1. A capacitance detecting circuit for detecting changes in capacitances at intersections between a plurality of row lines and a column line as voltages, comprising:
    column-line driving means for driving the column line;
    code generating means for generating code having orthogonality in chronological order;
    selection synthesizing means for selecting a certain number of row lines from the plurality of row lines by using the code and for synthesizing measured voltages at the intersections between the selected row lines and the driven column line so as to output the synthesized measured voltage in chronological order; and
    decoding computation means for separating the measured voltages corresponding to the capacitances at the intersections by performing product sum computation between the synthesized measured voltage and the code.

2. The capacitance detecting circuit according to claim 1, wherein the selection synthesizing means comprises:
    row-line selection means for dividing the plurality of row lines into a first row line group and a second row line group based on the code and for synthesizing the measured voltages for each of the first row line group and the second row line group so as to output the measured voltages as a first synthesized measured voltage and a second synthesized measured voltage, respectively; and
    differential amplifying means for differentially amplifying the first synthesized measured voltage and the second synthesized measured voltage so as to output a difference voltage between the first synthesized measured voltage and the second synthesized measured voltage corresponding to capacitances connected to the first row line group and the second row line group, respectively.

3. The capacitance detecting circuit according to claim 2, wherein the plurality of row lines are divided into a plurality of row line groups, each having a predetermined number of row lines, and the selection synthesizing means selectively changes the plurality of row line groups at predetermined intervals in chronological order, and drives the selected row line group by dividing the row lines into the first row line group and the second row line group based on the code without driving the row lines of the unselected row line groups.

4. A fingerprint sensor comprising the capacitance detecting circuit set forth in claim 2.

5. The capacitance detecting circuit according to claim 3, wherein the row line group includes the number of row lines smaller than the number of bits of the code, and the decoding computation means performs product sum computation by associating the row lines of the row line group with the bits at predetermined positions and by associating an imaginary row line with the remaining bit so as to decode the voltages corresponding to the capacitances at the intersections.

6. A fingerprint sensor comprising the capacitance detecting circuit set forth in claim 3.

7. The capacitance detecting circuit according to claim 1, wherein the code generating means generates PN code having autocorrelation, and sequentially shifts the order of a bit string of the PN code so as to output the PN code out of phase with each other in chronological order as the code.

8. The capacitance detecting circuit according to claim 1, wherein the code generating means generates Walsh orthogonal code having different orders of bit strings in chronological order so as to output the Walsh orthogonal code as the code.

9. The capacitance detecting circuit according to claim 1, wherein the capacitance detecting circuit is used for an area sensor in which the plurality of row lines and a plurality of column lines are disposed in a matrix to form intersections.

10. A fingerprint sensor comprising the capacitance detecting circuit set forth in claim 1.

11. A capacitance detecting method for detecting changes in capacitances at intersections between a plurality of row lines and a column line as voltages, comprising:

a column-line driving step of driving the column line;

a code generating step of generating code having orthogonality in chronological order;

a selection synthesizing step of selecting a certain number of row lines from the plurality of row lines by using the code and for synthesizing measured voltages at the intersections between the selected row lines and the driven column line so as to output the synthesized measured voltage in chronological order; and a decoding computation step of separating the measured voltages corresponding to the capacitances at the intersections by performing product sum computation between the synthesized measured voltage and the code.

* * * * *